US006664498B2

(12) United States Patent
Forsman et al.

(10) Patent No.: US 6,664,498 B2
(45) Date of Patent: Dec. 16, 2003

(54) METHOD AND APPARATUS FOR INCREASING THE MATERIAL REMOVAL RATE IN LASER MACHINING

(75) Inventors: Andrew C. Forsman, San Diego, CA (US); Paul S. Banks, San Marcos, CA (US); Michael D. Perry, Poway, CA (US)

(73) Assignee: General Atomics, San Diego, CA (US)

( * ) Notice: Subject to any disclaimer, the term of this patent is extended or adjusted under 35 U.S.C. 154(b) by 0 days.

(21) Appl. No.: 10/120,731

(22) Filed: Apr. 10, 2002

(65) Prior Publication Data

US 2003/0183603 A1 Oct. 2, 2003

Related U.S. Application Data

(60) Provisional application No. 60/338,258, filed on Dec. 4, 2001.

(51) Int. Cl.[7] .............................................. B23K 26/00

(52) U.S. Cl. ................. 219/121.6; 219/121.85

(58) Field of Search ....................... 219/121.6, 121.67, 219/121.68, 121.69, 121.85

(56) References Cited

U.S. PATENT DOCUMENTS

| | | | | |
|---|---|---|---|---|
| 4,059,759 | A | * 11/1977 | Harney et al. | .............. 250/206 |
| 5,554,335 | A | 9/1996 | Fields et al. | |
| 5,720,894 | A | * 2/1998 | Neev et al. | .................... 216/65 |
| 5,742,634 | A | * 4/1998 | Rieger et al. | ................. 372/25 |
| 6,150,630 | A | * 11/2000 | Perry et al. | ............ 219/121.68 |
| 6,156,030 | A | * 12/2000 | Neev | ........................... 606/10 |
| 6,168,744 | B1 | 1/2001 | Malshe et al. | |
| 2001/0009250 | A1 | * 7/2001 | Herman et al. | ........ 219/121.69 |
| 2002/0092833 | A1 | * 7/2002 | Lipman et al. | .......... 219/121.7 |
| 2002/0104831 | A1 | * 8/2002 | Chang et al. | ............ 219/121.7 |
| 2002/0167581 | A1 | * 11/2002 | Cordingley et al. | ........ 347/173 |

OTHER PUBLICATIONS

Bauerle, Dieter; *Plume Expansion, Shock Waves*; Laser Processing and Chemistry, 3rd Ed.; ©2000; pp. 638–644; Springer–Verlag; Germany.

Forsman, A.C. et al.; *Non–Doppler Shift Related Experimental Shock Wave Measurements Using Velocity Interferometer Systems For Any Reflector*; Physical Review E; ©2001; pp. 1–4; vol. 63, No. 056402; The American Physical Society.

Lee, Y.T. et al; *An Electron Conductivity Model For Dense Plasmas*; Phys. Fluids; May 1984; pp. 1273–1285; vol. 27, No. 5; American Institute of Physics.

More, R.M. et al.; *A New Quotidian Equation of State (QEOS) For Hot Dense Matter*; Phys. Fluids; Oct. 1988; pp. 3059–3078; vol. 31, No. 10; American Institute of Physics.

Perry, M.D.; *Ultrashort–Pulse Laser Machining*; Handbook of Laser Materials; ©2001; pp. 499–508; Laser Institute of America; Orlando, FL.

Ready, John F.; *Effects of High–Power Laser Radiation*; Academic Press; 1971; pp. 109–118; New York/London.

(List continued on next page.)

*Primary Examiner*—M. Alexandra Elve
(74) *Attorney, Agent, or Firm*—Fitch, Even, Tabin & Flannery

(57) ABSTRACT

Methods and apparatus for material modification using laser bursts including appropriately timed laser pulses to enhance material modification. In one implementation, a method for material modification comprises the steps of: providing bursts of laser pulses, wherein each burst comprises at least two laser pulses, wherein each laser pulse has a pulse duration within a range of between approximately 10 ps and 100 ns, wherein a time between each laser pulse of each burst is within a range of between approximately 5 ns and 5 μs; a time between successive bursts is greater than the time between each laser pulse comprising each burst; and directing the bursts upon a workpiece, wherein an intensity of a primary laser pulse of each burst exceeds a damage threshold of the workpiece.

46 Claims, 17 Drawing Sheets

OTHER PUBLICATIONS

Ready, John F.; *Gas Assist Techniques*; Handbook of Laser Materials; ©2001; pp. 431–432; Laser Institute of America; Orlando, FL.

Ready, John F.; *Percussion Drilling and Trepanning*; Handbook of Laser Materials; ©2001; p. 474; Laser Institute of America; Orlando, FL.

Stuart, B.C. et al.; *Laser–Induced Damage in Dielectrics With Nanosecond to Subpicosecond Pulses*; Physical Review Letters; Mar. 20, 1995; pp. 2248–2251; vol. 74, No. 12; American Physical Society.

Lehane et al., *Enhanced Drilling Using A Dual–Pulse Nd:YAG Laser*, Applied Physics A (Materials Science & Processing), Apr. 2001, pp. 45–48, Springer–Verlag.

Charles Whipple, *Eye on Technology: Cleaning Up Laser–produced Plasma*, Spie's oeMagazine, Mar. 2003, pp. 10, 11, and 13.

* cited by examiner

METHOD AND APPARATUS FOR INCREASING THE MATERIAL REMOVAL RATE IN LASER MACHINING

This application claims the benefit of U.S. Provisional Application No. 60/338,258, entitled METHOD FOR INCREASING THE MATERIAL REMOVAL RATE IN LASER MACHINING, of Forsman, et al., filed Dec. 4, 2001, the disclosure of which is incorporated herein by reference.

FIELD OF THE INVENTION

The present invention relates to methods of materials processing that use pulsed lasers. In particular, it relates to methods for increasing the rate and precision of material removal by pulsed laser radiation.

BACKGROUND OF THE INVENTION

Conventional mechanical lathes and machine tools (e.g., slitting saws) are effective for cutting/drilling materials down to approximately 100 microns kerf width at depths on the order of 1 millimeter (aspect ratio <10:1). Below this level, electron beam or laser tools are typically used for cutting or high precision machining (sculpting, drilling). The majority of electron beam and existing industrial laser technology remove material by a localized thermal process where the material to be removed is heated to the melting or boiling point. Laser processing by molecular dissociation in organic (and some inorganic) materials can be achieved with ultraviolet lasers but this photodissociation mechanism is not applicable to all materials.

The basic interaction in localized thermal processing as is achieved with electron beam or current state of the art lasers is the deposition of energy from the incident beam in the material of interest in the form of heat (lattice vibrations). A continuous or pulsed laser beam is directed towards a set of optics, which focuses the beam onto the workpiece. In the case of pulsed lasers, the beam 100 consists of a train of individual pulses 102 with a duration typically between 10 and 500 nanoseconds, e.g., 100 nsec, and a repetition rate between 0.1 and 100 kilohertz (see FIG. 1). Absorption of beam energy may differ strongly between materials dependent upon the thermomechanical properties of the metal. Laser absorption is also dependent upon the optical properties of the material of interest. Metals absorb laser energy quite differently than dielectrics for example.

The laser energy that is absorbed results in a temperature increase at and near the absorption site. As the temperature increases to the melting or boiling point, material is removed by conventional melting or vaporization. Depending on the pulse duration of the laser, the temperature rise in the irradiated zone may be very fast resulting in thermal ablation and shock. The irradiated zone may be vaporized or simply ablate off due to the fact that the local thermal stress has become larger than the yield strength of the material (thermal shock). In all these cases, where material is removed via a thermal mechanism there is an impact on the material surrounding the site where material has been removed. The surrounding material will have experienced a large temperature excursion or shock often resulting in significant change to the material properties. These changes may include a change in grain structure, microfracturing or an actual change in composition. Such compositional changes include oxidation (if cut in air or, in the case of alloys, changes in composition of the alloy. This effected zone may range from a few microns to several millimeters depending on the thermomechanical properties of the material, laser pulse duration and other factors (e.g., active cooling). In many applications, the presence of the heat or shock effected zone may be severely limiting since the material properties of this zone may be quite different from that of the bulk.

Another limitation of conventional laser or electron beam processing in high precision applications is the presence of redeposited or resolidified material. As mentioned previously, cutting or drilling occurs by either melting or vaporizing the material of interest. The surface adjacent to the removed area will have experienced significant thermal loading often resulting in melting. This melting can be accompanied by flow prior to solidification and the deposition of slag surrounding the kerf. In many high precision applications, the presence of slag is unacceptable. Also, redeposition of vaporized material on the walls or upper surface of the kerf is common. This condensate often reduces the quality of the cut and decreases the cutting efficiency since the beam must again remove this condensate before interacting with the bulk material underneath.

Many of these limitations can be reduced by the use of secondary techniques to aid the cutting process. The most common of these are active cooling of the material of interest either during or immediately following the laser pulse, and the use of high pressure gas jets to remove vaporized or molten material from the vicinity of the cut to prevent redeposition. These techniques can be effective at improving the kerf at the cost of a significant increase in system complexity and often a decrease in cutting efficiency.

The use of lasers employing extremely short (less than $10^{-10}$ seconds) pulses has recently been introduced to machine materials with extremely high precision, such as described in U.S. Pat. No. 5,720,894 entitled ULTRASHORT PULSE, HIGH REPETITION RATE LASER SYSTEM FOR MATERIAL PROCESSING, issued Feb. 24, 1998, which is incorporated herein by reference. This technique utilizes a non-thermal mechanism to remove material, such as described in U.S. Pat. No. 6,150,630 entitled LASER MACHINING OF HIGH EXPLOSIVES, issued Nov. 21, 2000, which is incorporated herein by reference. While the mechanism has been shown to achieve extremely high precision with negligible collateral damage to the remaining material, the pulse processing rate (volume of material removed per laser pulse) and the processing efficiency (grams of material removed per Joule of laser energy) is limited.

In most industrial machining processes, once an acceptable level of precision and collateral damage is achieved, attention then shifts to optimizing the processing rate and efficiency. Increases in processing rate have been achieved by a number of techniques including adjusting the laser wavelength for specific materials, beam shaping, trepanning, gas assists, etc. Nearly all of these techniques are material dependent and lead to a significant increase in the complexity of the laser machining system.

SUMMARY OF THE INVENTION

The present invention advantageously addresses the needs above as well as other needs by providing a method and apparatus for material modification utilizing a burst of laser pulses where the pulse durations and timing between bursts are controlled to enhance material removal rate.

In one embodiment, the invention may be characterized as a method for material modification and a means for accomplishing the method, the method comprising the following steps: providing bursts of laser pulses, wherein each burst comprises at least two laser pulses, wherein each laser pulse has a pulse duration within a range of between approximately 10 ps and 100 ns, wherein a time between each laser pulse of each burst is within a range of between approximately 5 ns and 5 µs; a time between successive bursts is greater than the time between each laser pulse comprising each burst; and directing the bursts upon a workpiece, wherein an intensity of a primary laser pulse of each burst exceeds a damage threshold of the workpiece.

In a further embodiment, the invention may be characterized as a method for material modification comprising the steps: providing bursts of laser pulses, wherein each burst comprises at least two laser pulses, a time between successive bursts is greater than a time between each laser pulse comprising each burst; directing the bursts upon a workpiece, wherein an intensity of a primary laser pulse of each burst exceeds a damage threshold of the workpiece; wherein a primary pulse of each burst produces an ablation plasma and an ejecta; and wherein a secondary pulse of each burst is timed to occur after substantial dissipation of the ablation plasma and to interact with the ejecta, whereby forming a heated material that interacts with the workpiece.

In another embodiment, the invention may be characterized as a method for material modification, comprising the steps: providing bursts of laser pulses, wherein each burst comprises at least two laser pulses, a time between successive bursts is greater than a time between each laser pulse comprising each burst; directing the bursts upon a workpiece, wherein an intensity of a primary laser pulse of each burst exceeds a damage threshold of the workpiece; wherein a primary pulse of each burst produces a first material phase to a temperature greater than 20,000 K and a second material phase to a temperature less than 10,000 K; and wherein a secondary pulse of each burst is timed to primarily interact with the second material phase.

In a further embodiment, the invention may be characterized as an apparatus for material modification comprising: a laser configured to produce laser pulses having a pulse duration within a range of between approximately 10 ps and 100 ns, a time in between the laser pulses greater than the pulse duration; a beam splitter configured to split each laser pulse into split laser pulses; a laser path traveled by each of the split laser pulses, each laser path having different lengths; and a beam combiner configured to receive each of the split laser pulses and direct the split laser pulses as a burst onto a workpiece. The different lengths of the each laser path are configured to cause a time of arrival at the workpiece between the split laser pulses to range between 5 ns and 5 µs; and an intensity of a primary pulse of the split laser pulses comprising each burst exceeds a damage threshold of the workpiece.

BRIEF DESCRIPTION OF DRAWINGS

Corresponding reference characters indicate corresponding components throughout the several views of the drawings.

DETAILED DESCRIPTION OF THE INVENTION

It is an object of the present invention to enable high precision laser processing of materials at a significant increase in processing speed and efficiency with minimal increase in system complexity.

In one embodiment, the present invention is a method to increase the processing rate and efficiency of laser machining by producing bursts of short duration laser pulses incident upon a workpiece for the purpose of drilling, cutting, and sculpting, for example. The timing between the pulses in the burst is such that the secondary (subsequent)

pulse(s) in the burst interact with the ejecta produced by the primary pulse. Herein, the term ejecta is used to denote any combination of vapor, plasma, or mixed material phases that include liquid, gas, and plasma.

Figure 2A:
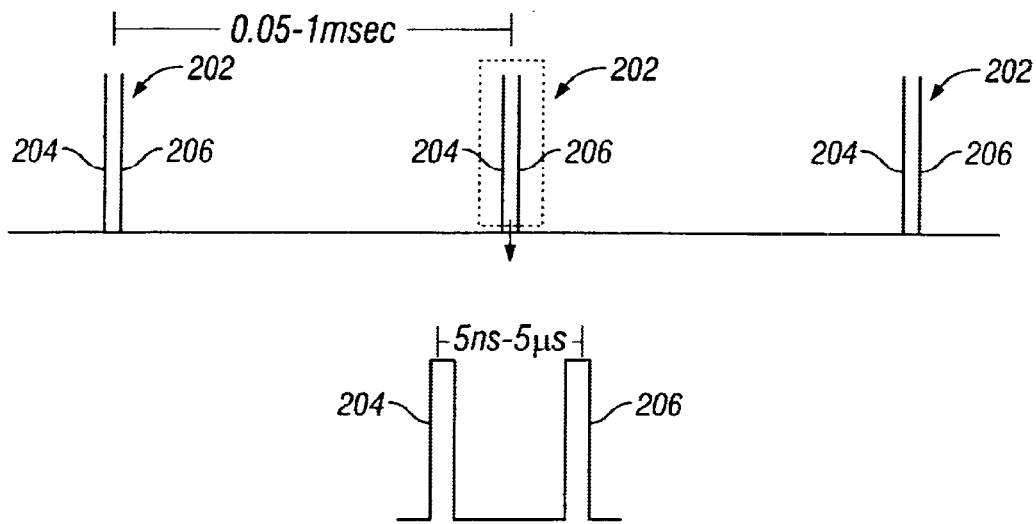
FIG. 2A illustrates one embodiment of a burst format in accordance with the present invention.

Referring to FIG. 2A, a workpiece is irradiated with bursts 202 of laser pulses 204, 206. In one embodiment, the individual pulses 204, 206 comprising each burst 202 have durations ranging from 10 ps to 100 ns and the time between each pulse 204, 206 within the burst 202 ranges from 5 ns to 5 $\mu$s. The time between bursts 202 is determined by the pulse repetition rate of the laser which can range from a few Hertz to approximately 100 kilohertz; however, the time between bursts 202 is substantially greater than the time between the pulses 204, 206 within each burst 202 (e.g., greater than 10 times, or greater than 100 times, or greater than 1000 times the time duration between the pulses 204, 206). All laser wavelengths and workpiece materials may be used in the implementation of this method. Furthermore, depending on the embodiment, the pulses 204, 206 may be configured to be the same wavelength or may be different wavelengths.

According to several embodiments of the invention, the intensity of the primary pulse, e.g., pulse 204, exceeds the damage threshold of the workpiece or target, such that an ejecta is produced. It is understood that the resulting "ejecta" produced by the interaction with the primary laser pulse originates from the solid density state of the workpiece and transitions in multiple phases of plasma, gas, low-density liquid or other mixture of phases, gradients of pressure, temperature and density until it eventually disappears. A more detailed explanation is presented when refering to FIGS. 6A–6E below. However, it is generally understood that this ejecta is produced in two main phases including an ablation plasma phase and a slow-moving ejecta phase. For simplicity, these phases are generally referred to as an ablation plasma (phase 1) and a slow-moving ejecta (or simply ejecta or phase 2). According to several embodiments of the invention, the timing of the secondary pulse(s), e.g., pulse 206, of each burst 202 is such that the ablation plasma has substantially dissipated prior to the secondary pulse(s); however, the secondary pulse acts primarily upon the slow-moving ejecta, not on the workpiece surface. Thus, the secondary pulses acts upon the slow-moving ejecta, which then forms a heated plasma or material that then acts upon the workpiece surface. This interaction of the secondary pulse(s) provides the enhancement in material removal rate, and is further described in more detail herein.

In some embodiments, each laser pulse in any given burst is directed at a location on the target or workpiece which spatially overlaps with at least a portion of the focal spot of the primary pulse. Thus, in some embodiments, the focal spot of the secondary pulse (e.g., pulse 206) is configured to have substantially the same spatial distribution as the primary pulse (e.g., pulse 204), while in other embodiments, the secondary pulse is configured to have a different spatial distribution than the primary pulse. It is understood that exact spatial overlap of each pulse in a burst is not required, only that the later pulses in a burst are focused to primarily interact with the ejecta produced by the primary pulse. The energy, duration, wavelength, and focal geometry of the primary pulse (e.g., pulse 204) in each burst is such that the damage threshold of the workpiece material is exceeded and workpiece material is ejected over some part of the focal spot. The duration, wavelength, and focal geometry of the secondary and subsequent pulses (e.g., pulse 206) in each burst 202 may be of any combination within the parameters given, but it is noted that in embodiments using steel, aluminum, and silicon, higher material removal rates are achieved when the energy is close to or exceeds the primary pulse energy. It is noted that although there are two laser pulses illustrated within a burst in FIG. 2A, in some embodiments, there are more than two laser pulses comprising a burst. It is also noted that although the pulses of FIG. 2A are illustrated as square pulses, the pulses may be configured as gaussian rounded, curved, triangular, or any other known pulse shapes.

In some embodiments, the timing of the secondary pulses (e.g., pulse 206) relative to the primary pulse (e.g., pulse 204) is important to the process. Material is ejected from the workpiece over a period of time that may begin with the onset of the primary laser pulse 204 but continues past the end of the primary laser pulse for periods of time that can range from less than $10^{-12}$ s to more than $10^{-7}$ s, depending on the material, the primary laser pulse 204, and the geometry of the laser focus and workpiece. Since the composition and physical properties of the ejecta vary with the material, environmental, and laser parameters and the time at which the ejecta is formed, in these embodiments, the timing of the secondary pulses 206 with respect to the primary pulse 204 is important to ensure that the ablation plasma has substantially dissipated so that the secondary laser pulse primarily interacts with slow-moving ejecta so as to optimize the removal of material from the workpiece.

A key difference between several embodiments of the present method and the known prior art is that the present method treats the presence of ejecta resulting from the initial laser-workpiece interaction as beneficial and as an important component in the process rather than either trying to remove it completely from the vicinity of the workpiece or to not produce it at all.

Figure 1:
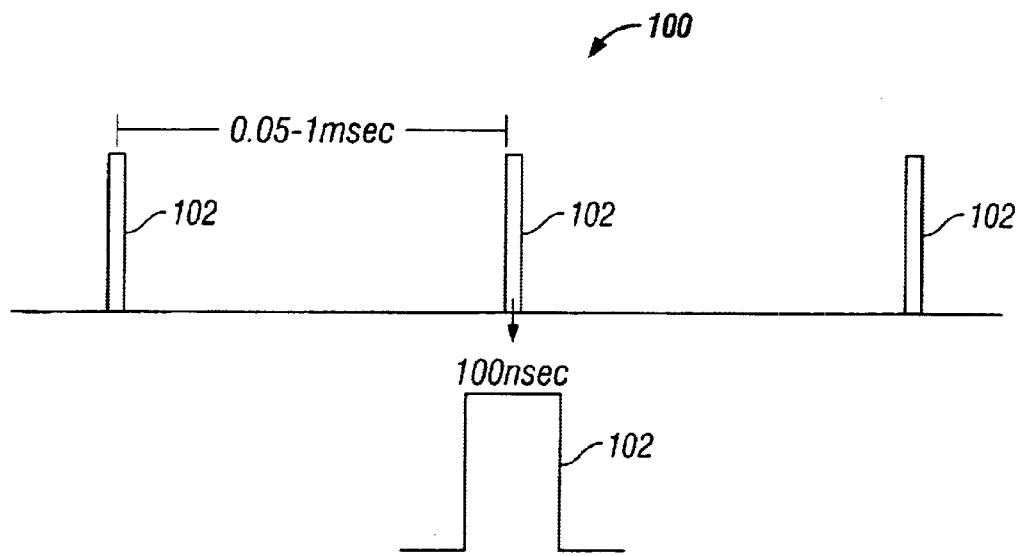
FIG. 1 illustrates a conventional pulse format which is directed onto a workpiece.

Even in methods that involve bursts of laser pulses in the related art investigated to date (for example, the method illustrated in FIG. 1), the ejecta from the workpiece is not used to enhance material processing. Instead, research seeking benefit to materials processing through the sequential application of laser pulses has centered around using an initial pulse in a burst of pulses to melt, weaken, roughen, or change other solid properties of the workpiece so that subsequent laser pulses can either produce a polished surface that serves as a marker (see for example, U.S. Pat. No. 5,554,335, issued Sep. 10, 1996, entitled PROCESS FOR ENGRAVING CERAMIC SURFACES USING LOCAL LASER VITRIFICATION, which is incorporated herein by reference) or remove weakened material (see for example, U.S. Pat. No. 6,168,744, issued Jan. 2, 2001, entitled PROCESS FOR SEQUENTIAL MULTI BEAM LASER PROCESSING OF MATERIALS, which is incorporated herein by reference) from the workpiece. Both these examples of art include in their description that the subsequent laser pulses act directly on the workpiece surface, and are limited in scope to materials marking and diamond processing.

Additional art involving the use of bursts of femtosecond laser pulses (such as described in U.S. patent application Ser. No. 2001 0009250 A1, published Jan. 26, 2001 and entitled BURST-ULTRAFAST LASER MACHINING METHOD, which is incorporated herein by reference), seeks benefit through applying laser pulses rapidly enough so that the substrate remains hot and the material remains soft between the laser pulses in the burst. Thus, according to the authors, the softened workpiece material is removed at a higher rate than virgin workpiece material would be. According to the inventors, the use of femtosecond pulses is essential since the ablation plasma is so small that it dissipates between each pulse, allowing the laser to act directly on the workpiece. As such, subsequent femtosecond pulses act directly on the workpiece surface itself. In contrast, subsequent nanosecond pulses of several embodiments of the invention (having a duration about a million times longer than the femtosecond pulses) are timed to primarily act on the ejecta phase of the material produced, not the workpiece itself.

Figure 2B:
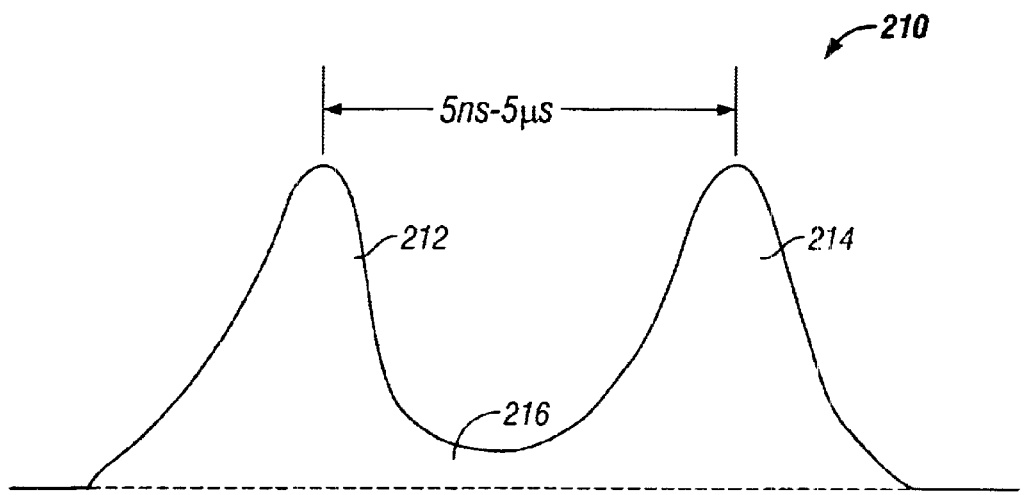
FIG. 2B illustrates another embodiment of a burst format in accordance with the present invention.

FIG. 2B illustrates an alternative burst format in accordance with several embodiments of the invention. In this embodiment, burst 210 comprises an aggregated group of pulses 212, 214. For example, the burst comprises overlapping pulses or contiguously timed pulses. In some embodiments, the burst appears to be several separate pulses smeared together. In this embodiment, the pulses 212, 214 are designed such that some minimal pulse energy (e.g., intermediate laser emission 216) remains in between pulses 212, 214. These pulses 212, 214 function equivalently to the discrete (i.e., separate) laser pulses illustrated in FIG. 2A. Similar to the discrete pulses 204, 206 of FIG. 2A, the pulses 212, 214 of FIG. 2B have durations ranging from 10 ps to 100 ns and the time between each pulse 212, 214 in the burst 210 ranges from 5 ns to 5 µs. Again, the time between successive bursts 210 is determined by the pulse repetition rate of the laser which can range from a few Hertz to approximately 100 kilohertz, e.g., between about 0.05–1.0 msec. However, the time between bursts 210 is substantially greater than the time between the spikes 212, 214 within each burst 210 as described above.

It is noted that although the pulses 212, 214 are illustrated as slightly overlapping, the pulses 212, 214 are preferably designed such that any intermediate laser emission 216 in between the peaks of the pulses 212, 214 does not have sufficient energy to cause additional ablation plasma to be produced as it impacts the ejecta. As will be seen with reference to FIGS. 6A–6E, in many embodiments, the material removal rate is enhanced when the outermost regions of the ablation plasma have dissipated, thus allowing incoming light (of the secondary pulse, e.g., pulse 214) to reach the higher density material or ejecta close to the workpiece. The quickly dissipating outermost plasma, previously identified as the ablation plasma, will dissipate most rapidly if additional ablation plasma is not generated between the primary and secondary pulses. Hence, the absence of laser radiation between the primary and secondary laser pulses is an efficient implementation of the present method and is illustrated in FIG. 2A.

Figure 10:
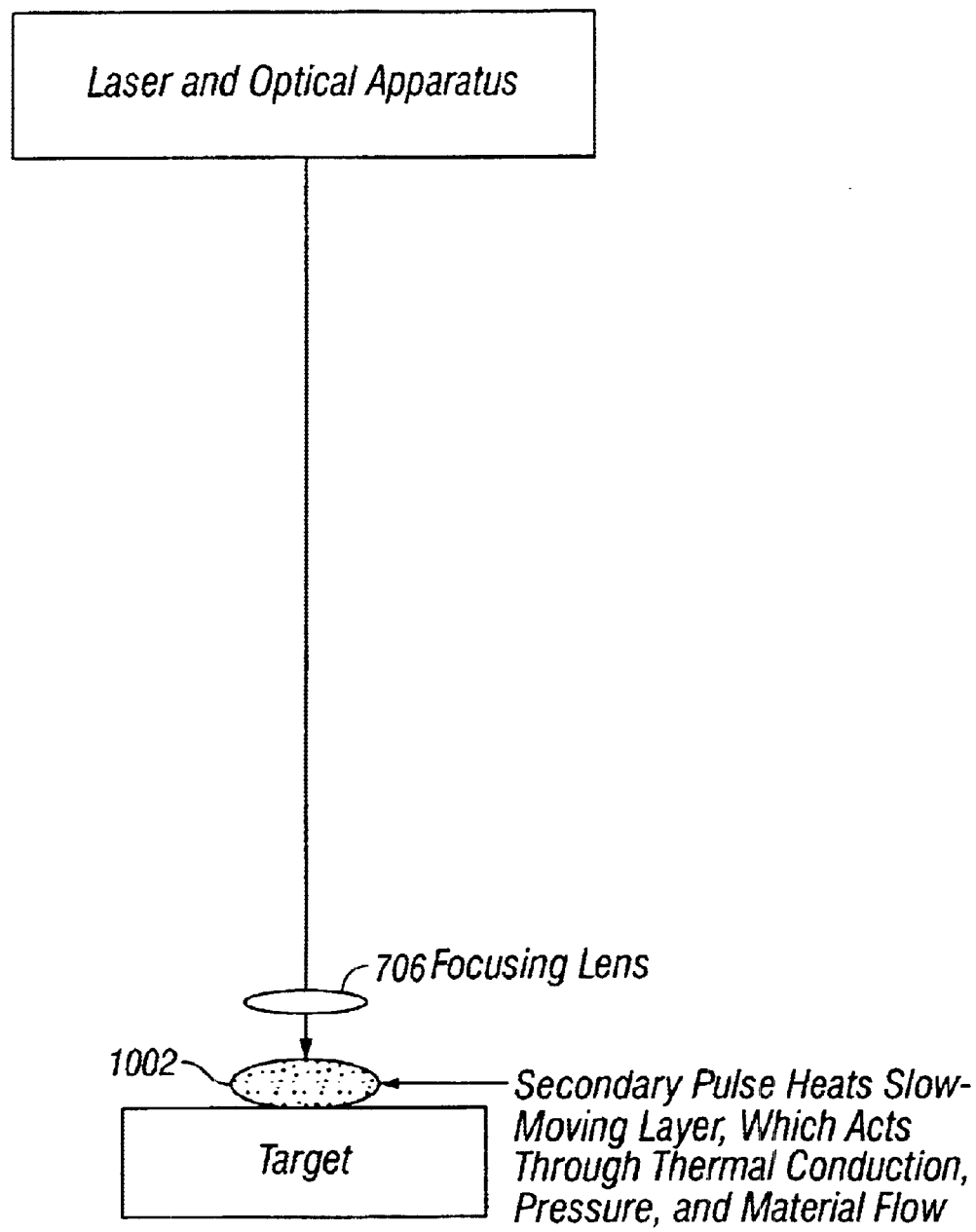
FIG. 10 is a schematic of the method of FIGS. 7–9 further illustrating Stage 4: Interaction of Secondary Pulse.

However, as illustrated in FIG. 2B, it may not be necessary to eliminate all laser radiation between the primary and the secondary pulses in order to achieve the situation described below in FIG. 6D and FIG. 10. The presence of intermediate laser emission (e.g., intermediate laser emission 216), that is at a sufficiently low intensity for a sufficient duration to allow substantial dissipation of the ablation plasma, may compromise the efficiency of the method but will not necessarily eliminate all benefits in the material removal rate. Thus, the intermediate laser emission has a sufficiently low intensity that will not cause additional ablation plasma to be generated upon interacting with the workpiece. The maximum amount of intermediate laser emission that will not produce additional ablation plasma will vary depending on the materials, atmosphere and laser parameters.

Thus, according to many embodiments of the invention, when referring to a burst comprising two or more laser pulses, it is understood that these laser pulses may generally be any pulse-like structure, such as the discrete pulses 204, 206 illustrated in FIG. 2A or the overlapping or contiguously timed pulses 212, 214 illustrated in FIG. 2B as long as any intermediate emission 216 between pulses 212, 214 is not sufficient to create additional ablation plasma. Further examples of burst formats are illustrated in FIG. 2C and FIGS. 20–22.

Figure 3A:
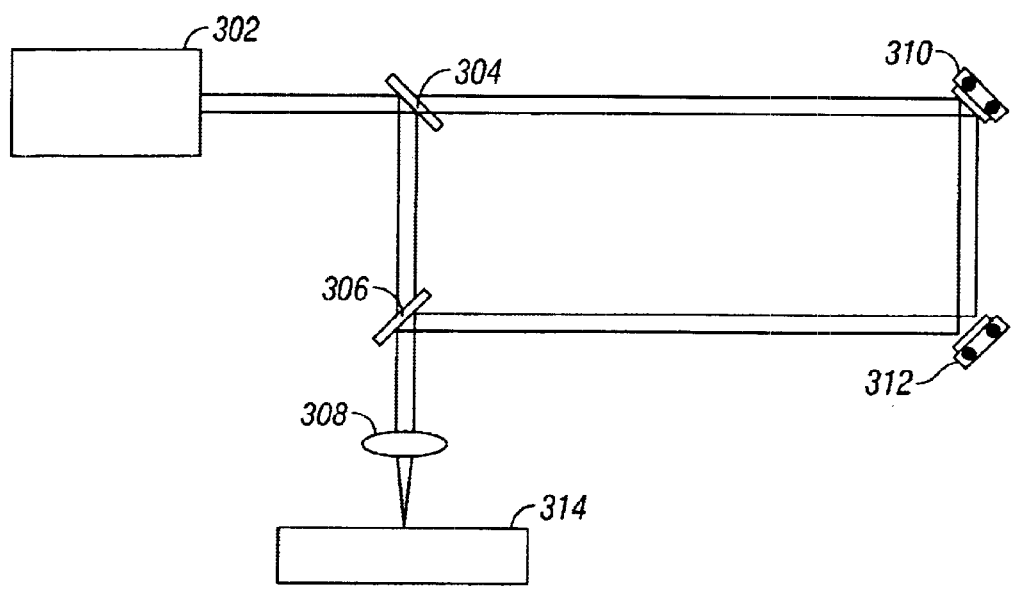
FIG. 3A illustrates a system for implementing the pulse format of FIG. 2A having uniform wavelengths according to one embodiment of the invention.

FIG. 3A a system for implementing the pulse format of FIG. 2A having uniform wavelengths according to one embodiment of the invention. In this embodiment, for example, a single laser pulse of approximately 3 nanoseconds duration and 532 nm wavelength is produced by the laser 302, although it is understood that the laser pulse may have other durations and another wavelength and be in accordance with several embodiments of the invention. The laser 302 produces these single pulses at an adjustable repetition rate between 10 and 100 KHz (e.g., between 10 and 10 KHz). The pulse strikes a beam splitter 304 which is designed to reflect 50% of the incident light. At this point, the pulse is divided into two pulses (also referred to as split pulses). The pulse which is reflected from the beam splitter 304 is directed towards the beam combiner 306 and the focusing assembly 308. The second pulse (i.e., the split pulse transmitted through the beam splitter 304) travels through a delay line composed of a pair of high reflecting mirrors 310 and 312 placed several meters from the beam splitter 304. After traversing the delay line, the split pulse or second pulse strikes the beam combiner 306. The beam splitter 304 and the beam combiner 306 may consist of one of a number of beam combining optics: beam splitters, polarizer, mirror containing a hole, etc. Upon striking the beam combiner 306, the second pulse is directed toward the focusing optic 308. The paths of the first and second pulse are sufficiently close that they are focused to approximately the same location on the workpiece 314, i.e., the first and second pulses have approximately the same spatial distribution. Thus the first and second pulse correspond to the primary and secondary pulses described above. It is noted that the first and second pulses may be focused to have substantially identical spatial distributions or different spatial distributions which still provide for the interaction of the second pulse with the ejecta produced by the first pulse. It is further noted that different choices of beam splitter 304 or beam combiner 306 design or components may change the distribution of energy and/or spatial distribution among the pulses in the burst. This is a desirable ability, since the optimum energy distribution between the pulses changes with the material and application. As such, in some embodiments, the primary pulse and the secondary pulses may be configured to have substantially equal energies and/or intensities or different energies and/or intensities.

Therefore, the system of FIG. 3A illustrates a simple structure to produce a burst comprising 2 pulses having the appropriate pulse durations and time in between pulses. It is understood that the duration between pulses may be easily modified by altering the distance of the beam splitter 304 beam combiner 306 and the reflecting mirrors 310 and 312, i.e., changing the length of the path traversed by the second pulse.

In this embodiment, the burst of pulses consists of two pulses. Furthermore, in this embodiment, each pulse in the burst has equal energy, and are incident on the target 90 ns apart. It is noted that the optimum interpulse delay is material and application specific. In one embodiment, the focal spot diameter is 100 um and a plano-convex f:10 lens is used for the focusing assembly 308. The energy of each pulse is varied from 0.25 mJ to 7 mJ, and accordingly the energy of each burst ranges from 0.5 mJ to 14 mJ; however, it is understood that the exact values for the energy of the pulses and burst may be varied to match the needs of the application.

Figure 2C:
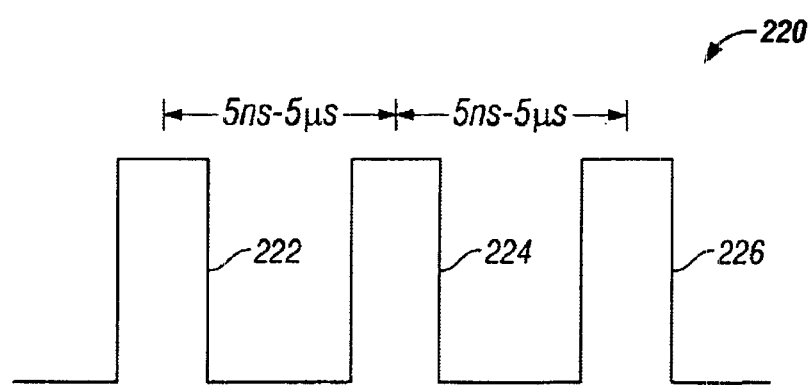
FIG. 2C illustrates another embodiment of a burst format in accordance with the present invention.

It is noted that the burst of pulses may comprise more than two pulses and that one of ordinary skill in the art could easily configure the apparatus of FIG. 3A to accomplish this. Such a burst format 220 including three consecutive laser pulses 222, 224 and 226 is illustrated in FIG. 2C. Preferably, as described above, the primary pulse 222 creates the fast-moving ablation plasma phase and the slow-moving ejecta phase, while the secondary pulses 224 and 226 primarily act upon the slow-moving ejecta phase. The pulses of burst 220 are timed such that there is approximately 5 ns to 5 μs in between successive pulses. It is noted that although the pulses of FIG. 2C are illustrated as discrete pulses, the burst format could be easily modified to a burst format having overlapping pulses 212, 214, such as illustrated in FIG. 2B.

It is further noted that the beam splitter 304 and the beam combiner 306 of the system of FIG. 3A may be altered or modified in order to produce a burst format having overlapping or contiguously timed bursts 212, 214, such as illustrated in FIG. 2B.

Figure 4:
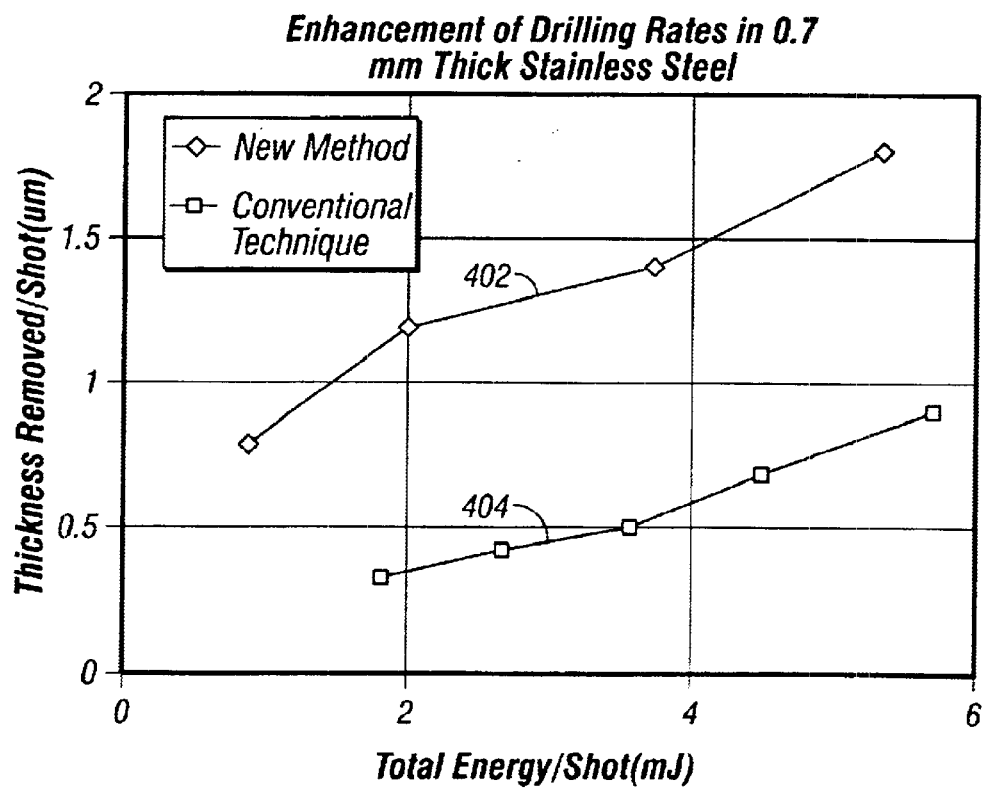
FIG. 4 is a plot illustrating an enhancement of hole drilling in steel using a method in accordance with one embodiment of the invention.

FIG. 4 illustrates the improvements in machining speed. FIG. 4 is a plot of the total energy/shot, where shot refers to a single burst comprising two or more pulses, vs. the thickness removed/shot in 0.7 mm thick stainless steel. It is clearly seen that the drilling rate is enhanced using a method in accordance with the present invention, e.g., line 402 represents a method according to FIG. 2A, for example, while line 404 represents a conventional method according to FIG. 1. It is also understood that the methods described herein may also be for cutting, sculpting or other material modification.

In another embodiment, in the drilling of silicon wafers an additional advantage becomes apparent. The silicon fractures and thus degrades the hole quality if increasing the speed of conventional laser drilling techniques is sought through increasing the power of each laser pulse. Several embodiments of the present method, however, allow much greater increases in drilling speed without inducing fractures of similar magnitude. In work done to date, the speed increase is a factor between 5 to 10. As will be explained later, this phenomenon is associated with the mitigation of ablation pressure that arises from using the secondary laser pulses to heat ejecta instead of the workpiece.

Figure 5:
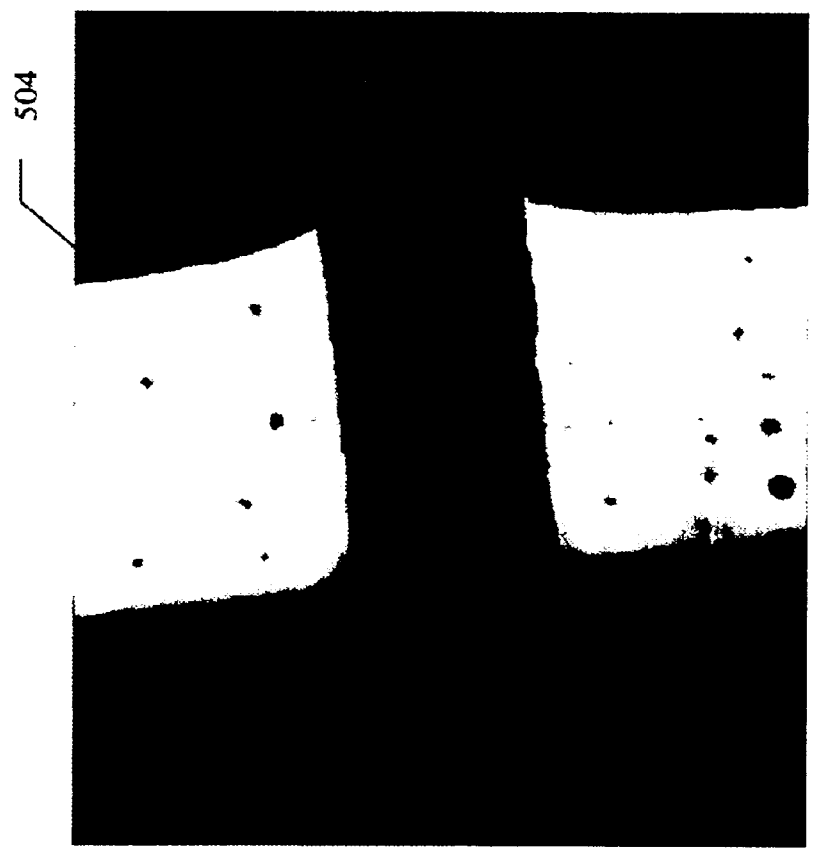
FIG. 5 is a photograph illustrating a cross sectional view of a trepanned Aluminum Slot comparing a conventional method and a method in accordance with one embodiment of the invention.
Figure 5:
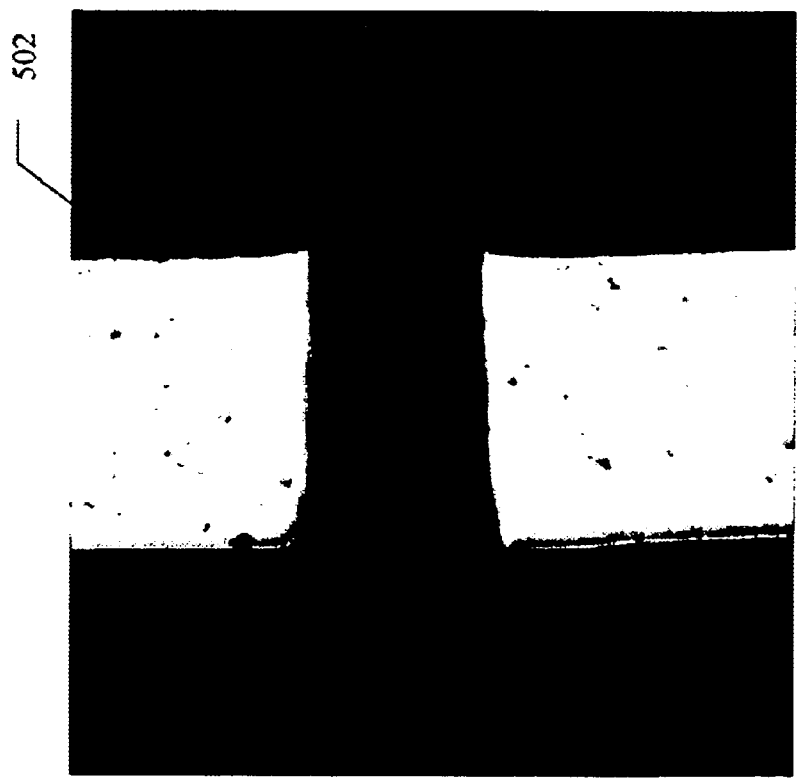

Not only is the speed of drilling and cutting increased, the quality appears undergo improvement. FIG. 5 illustrates photographic images 502 and 504 of cross sections of a slot trepanned in aluminum that is 0.4 mm thick. A technique in accordance with one embodiment of the invention (image 502) yielded improvement in cutting speed of more than a factor of two, and reduced the deformations around the exit and entrance edges of the slot in comparison to known techniques (image 504). It is noted that in the illustrations of FIG. 5, the energy of the secondary pulse was approximately 3 times that of the primary pulse.

Figure 3B:
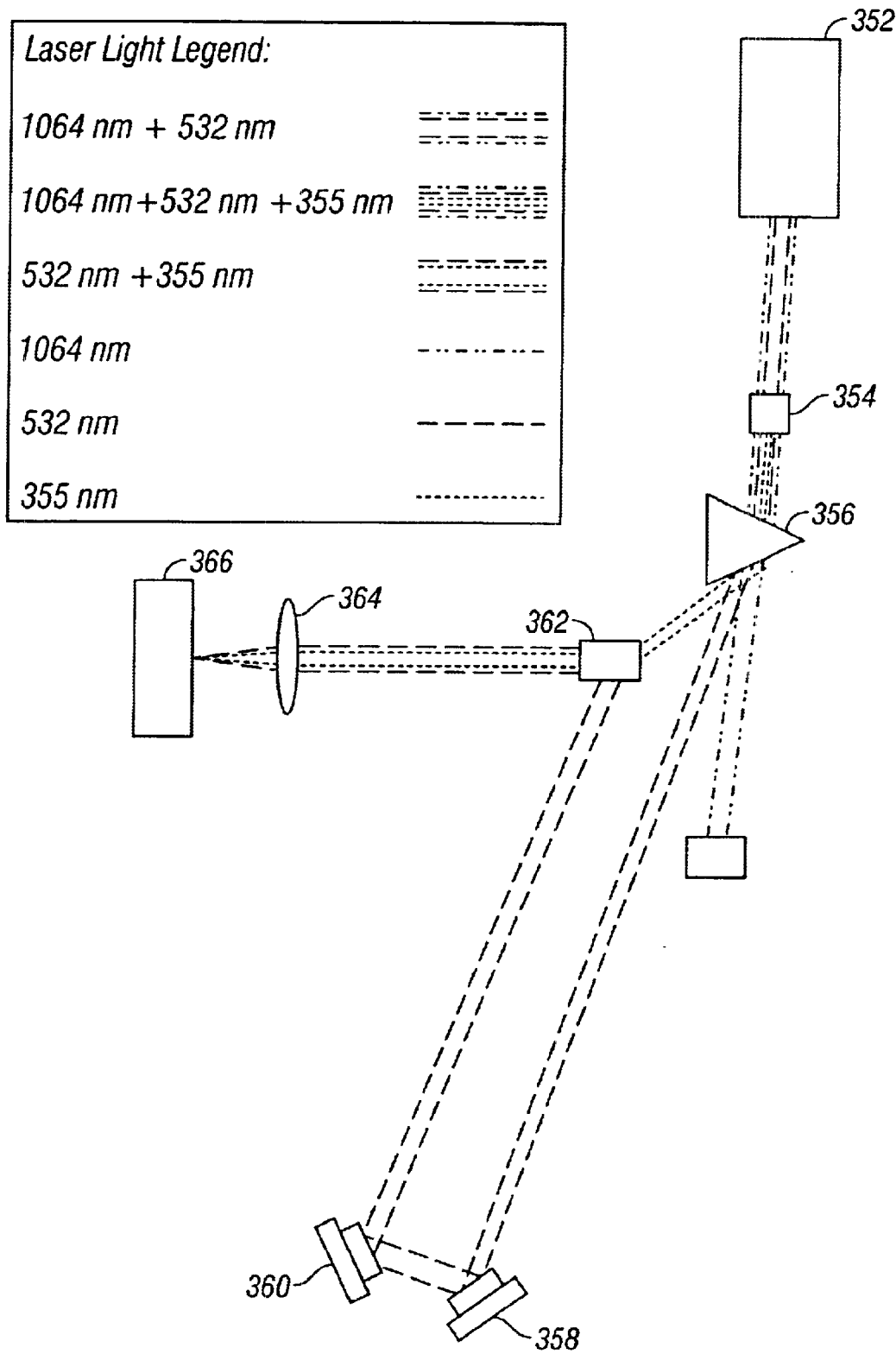
FIG. 3B illustrates a variation of the system of FIG. 3A for implementing a pulse format having dual wavelengths.

A second embodiment involves the use of multiple wavelengths, and is shown in FIG. 3B. In this embodiment, a single laser pulse of approximately 3 ns duration and being composed simultaneously of 532 nm and 1064 nm wavelength light is produced by the laser 352. The laser 352 produces these single dual-wavelength pulses at an adjustable repetition rate between 10 and 100 KHz. The pulse strikes a crystal 354 (e.g., an 8 mm thick KD*P crystal) that produces output light consisting of 1064 nm, 532 nm, and 355 nm through nonlinear frequency conversion. The now triple wavelength pulse refracts through a wavelength separator 356 (generically referred to as a beam splitter) to cause separation of the three output wavelengths (e.g., three split pulses are formed). This separator 356 could consist of a prism, or mirrors coated to provide preferential reflection at the appropriate wavelengths, or waveplates and polarizers, etc. In this embodiment, the 532 nm light traverses a delay line composed of a pair of high reflecting mirrors 358 and 360 placed several meters from the separator 356. After the delay line the 532 nm light strikes the beam combiner 362. This beam combiner 362 may consist of one of a number of beam combining optics: beam splitter, prism, polarizers, mirror containing a hole, etc. The 355 nm light proceeds from the separator 356 to the beam combiner 362 without traversing a delay loop. Each pulse of light, upon striking the beam combiner 362 is directed into the focusing assembly 364. The paths of the first (355 nm) and the second (532 nm) pulse are sufficiently close that they are focused approximately to the same location on the workpiece 366. It is understood that the exact parameters, such as pulse duration, wavelengths, etc. may be modified depending on the configuration of the system. In other embodiments, the 1064 nm light (i.e., the third split pulse) may traverse a different delay path and be combined at the combiner 362 to form an alternative burst format (see FIG. 2C, for example). Furthermore, as discussed above, this beam splitter and beam combining components may be modified to create discrete or overlapping/contiguously timed pulses having substantially the same or differing energies, substantially the same or different spatial distributions, and/or substantially the same or different pulse durations.

In work done to date in silicon, the use of 355 nm light and 532 nm light in this manner yields at least the same magnitude of enhancement in drilling speed over conventional technique as does the use of the new method with pulses having a single wavelength (e.g., see FIG. 4).

It is also understood that a delay line used to create the secondary pulse(s) may be composed using items other than mirrors 358, 360. For example, light could traverse an optical fiber instead of a delay loop defined by mirrors.

It is also understood that the beam splitter and beam combiner components could be configured to produce more than 2 pulses. For example, the beam splitter (e.g., separator 356) could split the initial pulse into three pulses each traversing a different delay path back to the beam combiner. In another example, an additional beam splitter may be introduced into the delay line to split the secondary pulse into two secondary pulses to be directed back to the beam combiner.

FIGS. 6A–6E are graphs that illustrate the evolution of the density of a workpiece illuminated with a laser pulse and the resulting ejecta vs position relative to the workpiece surface in accordance with one embodiment of the invention. Throughout the process of transforming the workpiece material from its original solid state to a plasma, gas, low-density liquid or a mixture of phases, the material state will best be described as containing gradients that include density, pressure, and temperature. As the transforming material continues to evolve, so too will the gradients. In the absence of external forces this material will eventually disappear. This leaves the workpiece in its solid state, missing the material that was removed, surrounded by the ambient atmosphere devoid of significant workpiece material. As such, FIGS. 6A–6E schematically depict the evolution of the density as a function of position at 5 different times in the foregoing process.

Figure 6A:
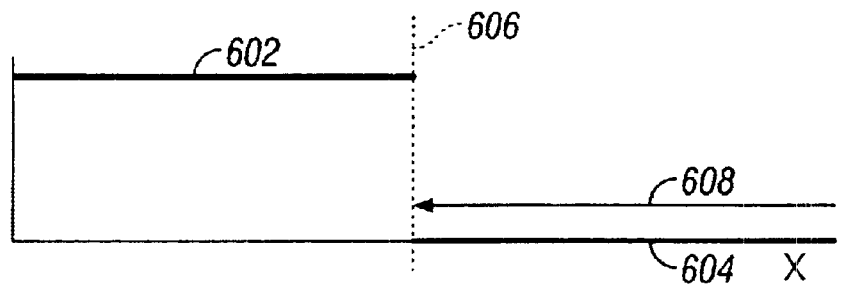
FIGS. 6A–6E are graphs that illustrate the evolution of the density of a workpiece illuminated with a laser pulse and the resulting ejecta vs position relative to the workpiece surface in accordance with one embodiment of the invention.

FIG. 6A shows the density profile of the original workpiece 602 in a solid state before being struck by the laser pulse. Illustrated as 602 is the highest density of the workpiece, i.e., in its original solid state. The horizontal axis is the linear position with vertical line 606 indicating the original position of the workpiece surface. Thus, to the left of line 606 is the density of material under the surface of the workpiece such that moving further to the left corresponds to moving further within the workpiece material away for or into the surface. Similarly, to the right of line 606 is the density of the material (i.e., the atmosphere) at various positions away from the surface of the workpiece such that moving further to the right indicates material farther away from the workpiece surface. Line 604 represents a zero density line, e.g., in FIG. 6A, there is no workpiece material present. Line 608 represents the optical penetration for an incident laser pulse if one were to be directed at the workpiece. Thus, in accordance with several embodiments of the invention, a primary laser pulse, e.g., pulse 204, having an optical penetration indicated by line 608 is directed onto the workpiece surface.

Figure 6B:
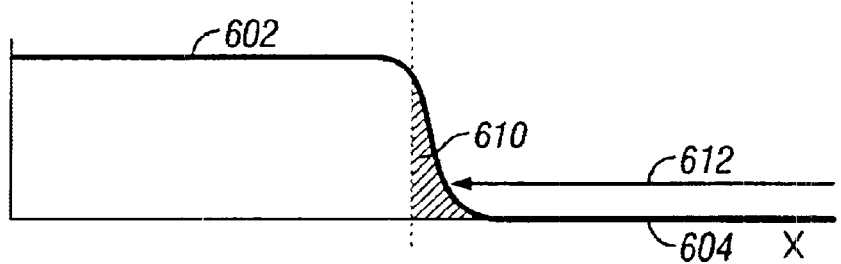

FIG. 6B shows the density profile during the interaction of the primary laser pulse with the workpiece. Upon impact, a portion of the workpiece is removed from the workpiece surface and moves into the ambient atmosphere. The removed material is illustrated as the small curve in line 602 just to the left of line 606. However, this removed material is transformed into a plasma 610 or ejecta expanding away from the workpiece surface, which is illustrated as the shaded portion extending to the right of line 606 to the zero density line 604. As is seen, this plasma 610 is made up of material having many different densities. Horizontal arrow 612 represents the optical penetration of laser into the plasma 610 if another laser pulse was to be fired at this time. For typical picosecond, nanosecond, and microsecond laser pulses, this laser light would penetrate the density gradient until the plasma frequency is equal to the optical frequency. Depending on the temperature and the mass density of the plasma, this equivalency can occur at densities that may range from $\frac{1}{10}^{th}$ solid density to $\frac{1}{1000}^{th}$ solid density. Hence, as this laser would heat the plasma and the plasma would expand, this laser would start to interact with the plasma, and would cease to reach the high-density solid material of the workpiece behind the plasma.

Figure 6C:
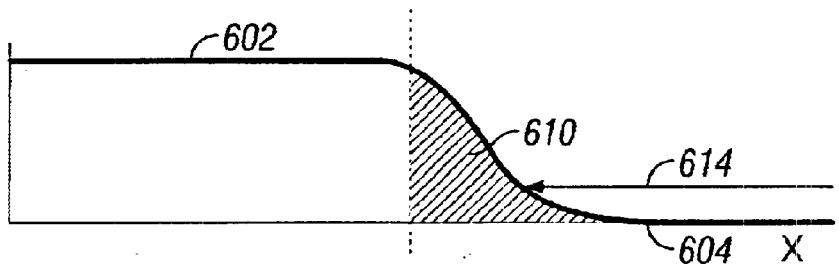

FIG. 6C shows the evolution of the plasma 610 and other ejecta from the target after the primary laser pulse. The outer regions of the plasma 610 (i.e., those portions furthest to the right of line 606 in FIG. 6C) expand more quickly than the higher density material closer to the target surface. As the outer regions expand, their density and temperature fall. Again, line 614 represents the optical penetration of laser into the plasma 610 if another laser pulse were to be fired at this time. Again, such a pulse would not penetrate the plasma 610 material and thus, would not interact with the workpiece surface. Note that a laser pulse fired at this time would interact with ejecta further from the surface of the workpiece in comparison to FIG. 6B.

Figure 6D:
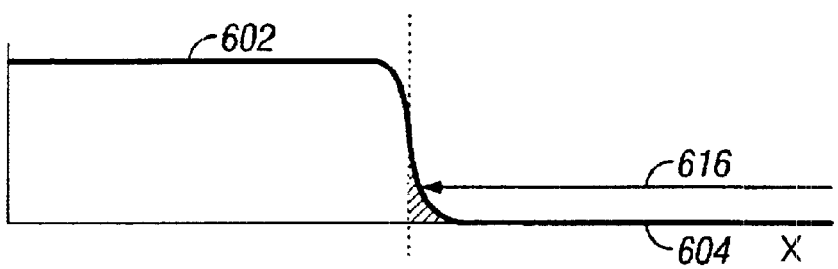

FIG. 6D shows the plasma 610 and the ejecta at the time at which a secondary laser pulse, e.g., laser pulse 206 would be fired into the workpiece in accordance with several embodiments of the invention. At this time, the outer regions of the plasma have undergone sufficient expansion so that the laser light can pass through them and strike the higher density plasma, vapor, ejecta, or mixtures thereof that have yet not dissipated and that are relatively close to the workpiece surface. Line 616 represents the optical penetration of laser into the plasma 610 for the secondary pulse. Advantageously, according to many embodiments, the low density plasma has substantially dissipated leaving the higher density, slower moving ejecta that is closer to the workpiece surface. The secondary pulse(s) are intended to primarily interact with this higher density, slower moving ejecta that is closer to the workpiece surface (which has been generally referred to herein as the slow moving ejecta), and not substantially with the low density, fast moving ejecta phase (herein referred to as the ablation plasma). By directing the secondary pulse(s) at this point in time, it is believed that an enhanced material removal rate is obtained.

Figure 6E:
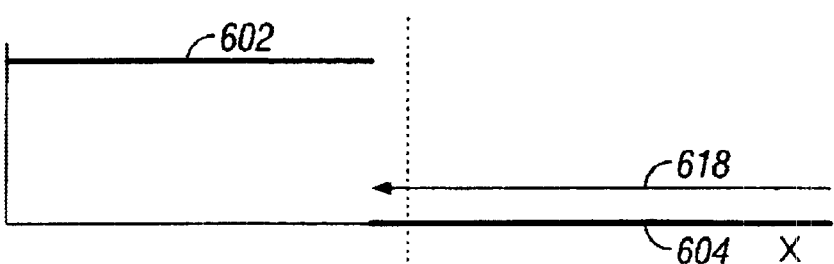

FIG. 6E shows the density gradient, if a secondary pulse is not fired, at times sufficiently long that material processes on the workpiece have ceased evolving (e.g., about 1 millisecond). Here, the target has no density gradients and undergoes a sharp transition from solid to ambient atmosphere, as was the case before any laser pulse struck the workpiece. However, the sharp change from solid to ambient atmosphere has shifted to the left, indicating that material has been removed. Additionally, line 618 represents the optical penetration that another laser pulse might have if an additional pulse were to be fired at a later time. For example, the workpiece at this time may be irradiated with another burst of pulses such that another primary pulse 204 would impact the workpiece surface in accordance with several embodiments of the invention. In contrast, conventionally, a second laser pulse would be fired at the workpiece at this time, after all ejecta has disappeared (see, for example, FIG. 1).

It is noted that the above description of the interactions of a workpiece and the various transition of phases as a result of impact with a single laser pulse is generally understood to those skilled in the art. Although a truly accurate description of the physical processes involved requires descriptions of the foregoing gradients, a useful approximation is to split the gradient into three zones or phases, according to their dominant physical characteristics. A first zone or phase is that corresponding to solid density matter, i.e., the workpiece prior to interaction with a laser pulse. This zone includes the liquid state of the material as it would be found in a molten pool, which typically has similar density to the solid state. A second zone or phase is that corresponding to the ejecta that is close to the target and dissipates relatively slowly, and according to several embodiments, is exposed to incoming light as shown in FIG. 6D. As previously discussed this ejecta could occur in a combination of several possible physical states that include liquid, vapor, gas, plasma, and particulate matter. Due to the relatively long dissipation time of this ejecta, this zone is referred to as "slow moving ejecta". A third zone or phase is that of the ablation plasma which moves relatively quickly and dissipates relatively rapidly, and hence will be called the "ablation plasma".

Classifying these gradients according to their characteristic states of matter and the timescales along which they evolve is simply one way to explain the mechanisms by which several embodiments of the invention yield benefit to laser materials processing. Another approximation to distinguish different phases of the ejecta is defined in terms of the temperature of the resulting ejecta. For example, the slow moving ejecta generally has a temperature less than 10,000 K and the ablation plasma generally has a temperature greater than 20,000 K. This approximation excludes a portion of the gradient, but nonetheless does not obscure the clarity of the discussions surrounding the implementations of the methods presented herein.

Figure 7:
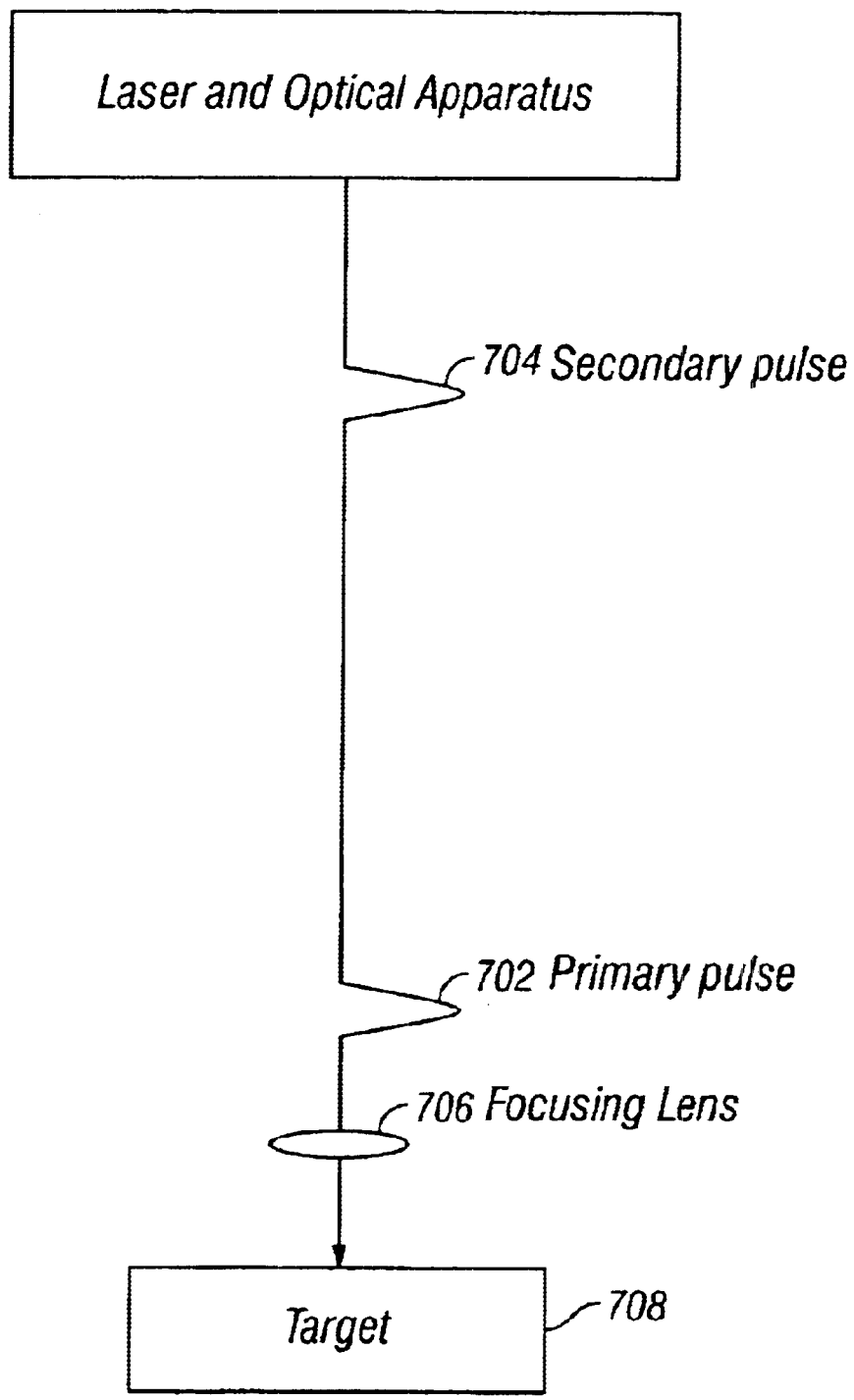
FIG. 7 is a schematic of a method in accordance with the one embodiment of the invention illustrating Stage 1: Prior to Primary Laser Pulse.
Figure 8:
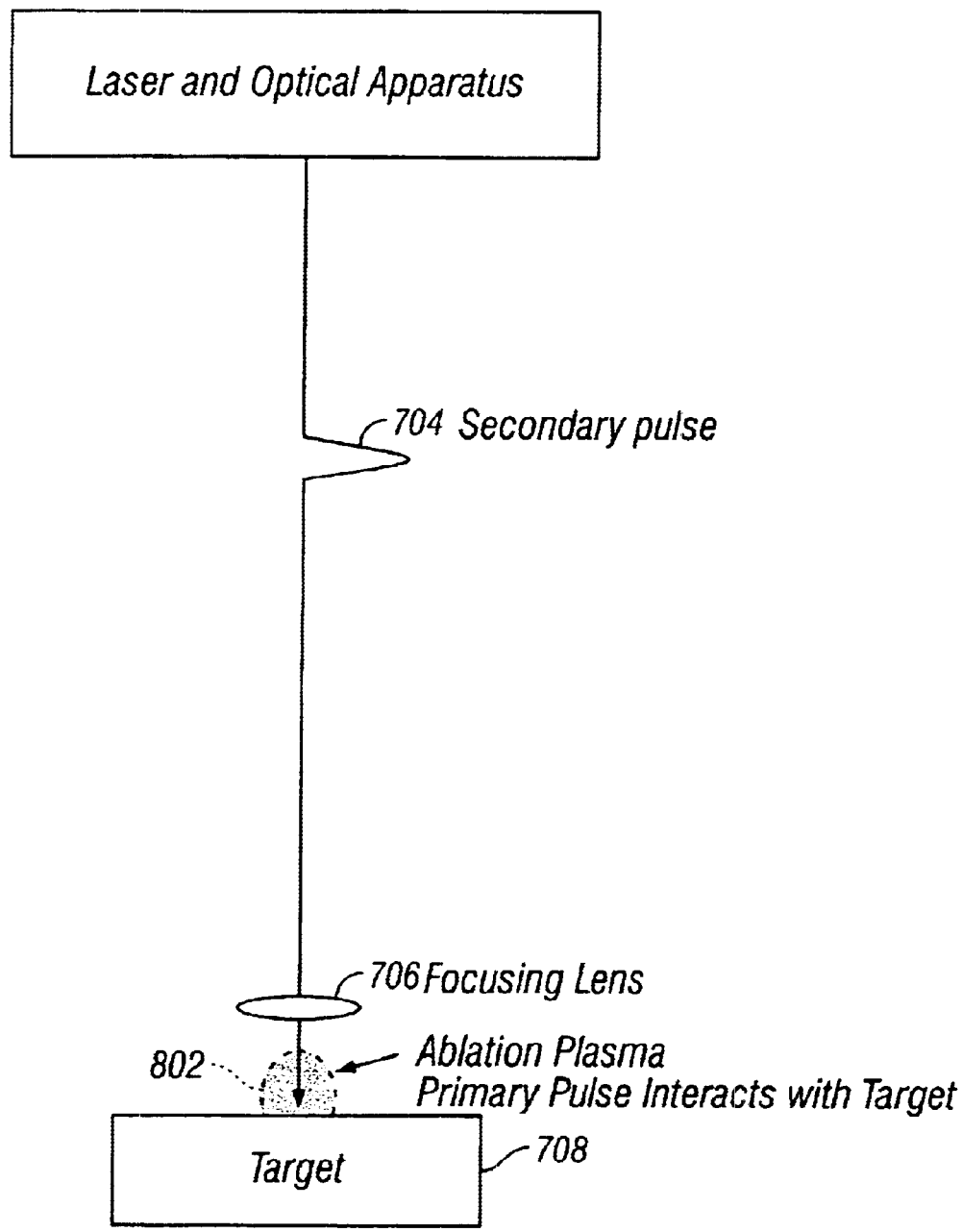
FIG. 8 is a schematic of the method of FIG. 7 further illustrating Stage 2: Interaction of Primary Pulse.
Figure 9:
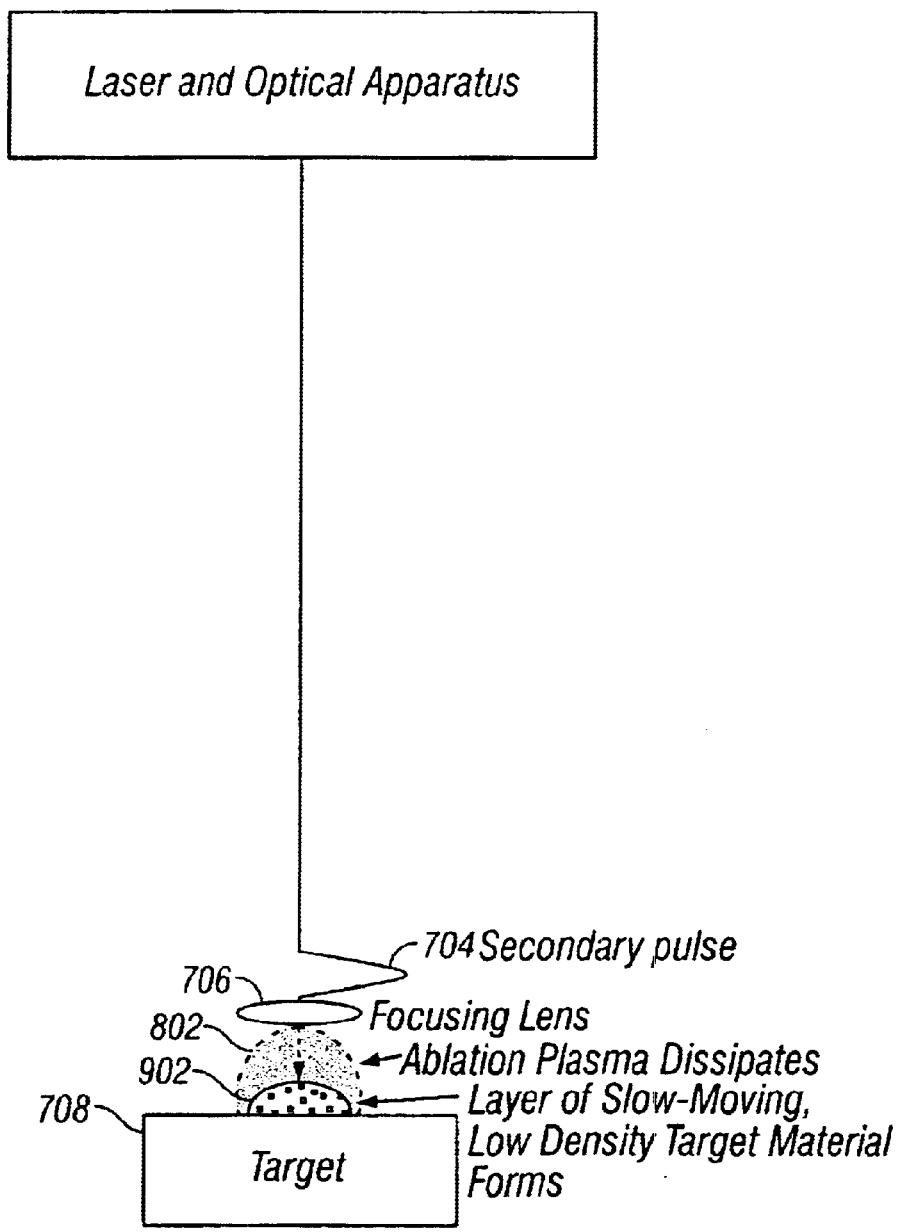
FIG. 9 is a schematic of the method of FIGS. 7 and 8 further illustrating Stage 3: Between Primary and Secondary Pulses.

FIGS. 7, 8, 9, and 10 provide a schematic representation in accordance with one embodiment of the invention of how the use of two appropriately timed laser pulses provides conditions favorable to material removal. The pulses of FIGS. 7–10 are produced by the appropriate laser and optical apparatus, for example, those described with reference to FIGS. 3A and 3B. FIG. 7 illustrates the primary pulse 702 and the secondary pulse 704 being directed at a target 708 (workpiece) through a focusing lens 706. FIGS. 8 and 9 illustrate the interaction of the primary pulse with the target 708. The primary pulse 702 produces an ablation plasma 802 which quickly dissipates and a slow-moving ejecta 902. It is noted that the ablation plasma and the slow moving ejecta are different phases of the resulting ejecta produced by the primary pulse 702, and a more thorough explanation is provided in FIGS. 6A–6E. It has been seen that the ablation plasma 802 is a fast-moving material, e.g., at least $10^6$ cm/s, and quickly dissipating material; however, the velocity of the ablation plasma 802 varies depending upon the workpiece material, the ambient environment and the laser irradiation parameters. It has been seen that the slow-moving ejecta 902 or material expands at a velocity much slower than that of the ablation plasma 802, e.g., between about $10^3$ cm/s to about $10^5$ cm/s; however, the velocity of this ejecta 902 varies depending upon the workpiece material, the ambient environment and the laser irradiation parameters. The secondary pulse 704 primarily acts upon the slow-moving ejecta 902, and generally not on the surface of the workpiece 708, in order to form a heated plasma or material 1002 (i.e., the heated ejecta 902). In brief, the method works through using the secondary pulses to heat a debris field (e.g., the slow-moving ejecta 902 phase of the ejecta produced by the primary pulse 702) produced by the primary pulse 702 in the immediate vicinity of the workpiece. This heated material 1002 (e.g., the heated slow-moving ejecta) then acts upon the workpiece and its ejecta to remove material from the workpiece. Measurements and analysis of pressure, temperature, and ejecta velocity explore the physical processes of conduction, pressure, hydrodynamics, and phase change and illustrate how the new method manipulates these processes to enhance material removal rates. Furthermore, this new data and analysis provides guidance for the development of machining techniques based on the new method. However, prior to a detailed technical discussion it is worth noting that the ejecta produced by the primary laser pulse appears in two distinct phases. First, there is an initial phase that consists of an ablation plasma (i.e., ablation plasma 702), which dissipates within 30 ns in the atmospheric environment of the present embodiment. It is noted that the dissipation rate of the ablation plasma phase of the ejecta may change if the environment is at a lower pressure, such as a vacuum, or a higher pressure, such as within a pressure chamber or in the presence of a gas assist jet. Second, there is a slow-moving body of ejecta (i.e., ejecta 902) that remains in the vicinity of the target point and does not dissipate prior to the arrival of the secondary pulse. It is also noted that in other embodiments, more than two pulses are used, e.g., a secondary pulse and one or more additional pulses to heat the ejecta 902 or debris field. It is noted that the primary pulse 702 and the secondary pulse 704 may be configured to have the same or different wavelength, the same or different energy levels, the same or different intensity, and/or the same or different spatial distribution. It is also understood that the pulses 702 and 704 in FIGS. 7–10 may be any pulse-like structure, for example, those described with reference to FIGS. 2A, 2B, 2C and 20–22.

Pressure Measurements:

In one embodiment, pressure measurements are undertaken by using a thin foil as a workpiece and using a Velocity Interferometer System for Any Reflector (VISAR), the operation and functionality of which is well known in the art.

Figure 11:
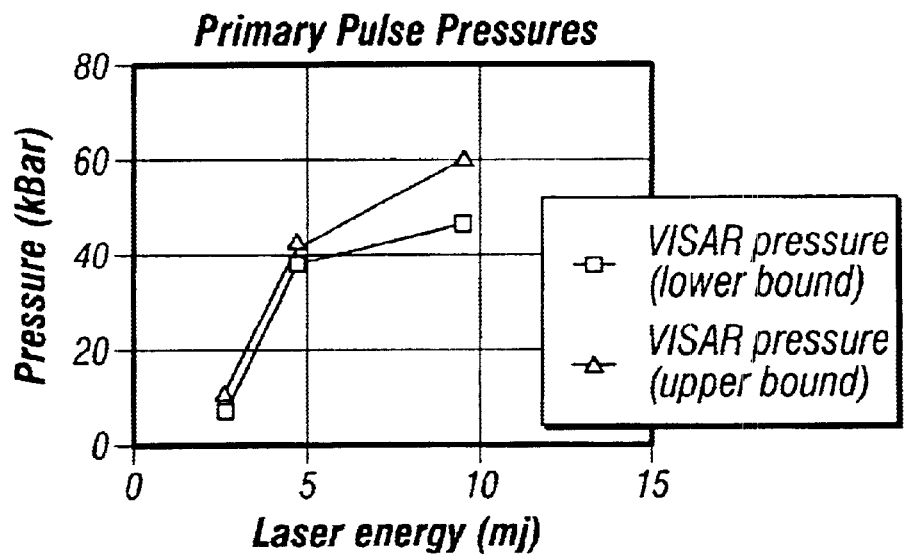
FIG. 11 is a plot illustrating the pressures produced by the primary pulse or primary pulse according to one embodiment of the invention.
Figure 12:
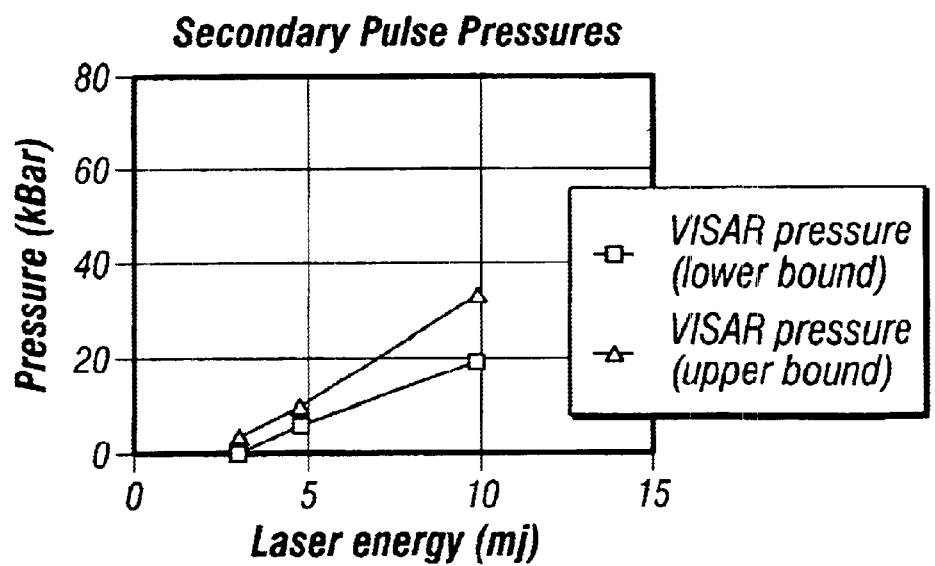
FIG. 12 is a plot illustrating the pressures produced by a secondary pulse in accordance with one embodiment of the invention.

The VISAR uses an optical probe (532 nm laser light) applied to the rear surface of a 10 µm thick target foil. The machining laser pulses strike the front surface of the foil. The foil is sufficiently thin that the pressure wave created at the front surface by the laser passes through the foil to the rear surface without attenuation. Hence, the pressure measurements made at the rear surface are an accurate representation of the pressures created by the laser machining pulses (e.g., pulses 702 and 704). FIGS. 11 and 12 show comparisons of pressures measured as a function of laser power, for both the primary laser pulses (FIG. 11) and the secondary laser pulses (FIG. 12). The lower and upper curves of pressure encompass the uncertainty of the measurement.

These graphs of FIGS. 11 and 12 show that the pressure produced by the secondary pulse, during the interaction of the secondary pulse with the ejecta produced from the primary pulse, in accordance with one embodiment of the invention, is at most ¼ to ½ the pressure produced by the primary pulse during the interaction of the primary pulse with the workpiece. This comparison renders it clear that the interaction of the secondary pulse with the ejecta is substantially different than the interaction of the primary pulse.

Figure 13:
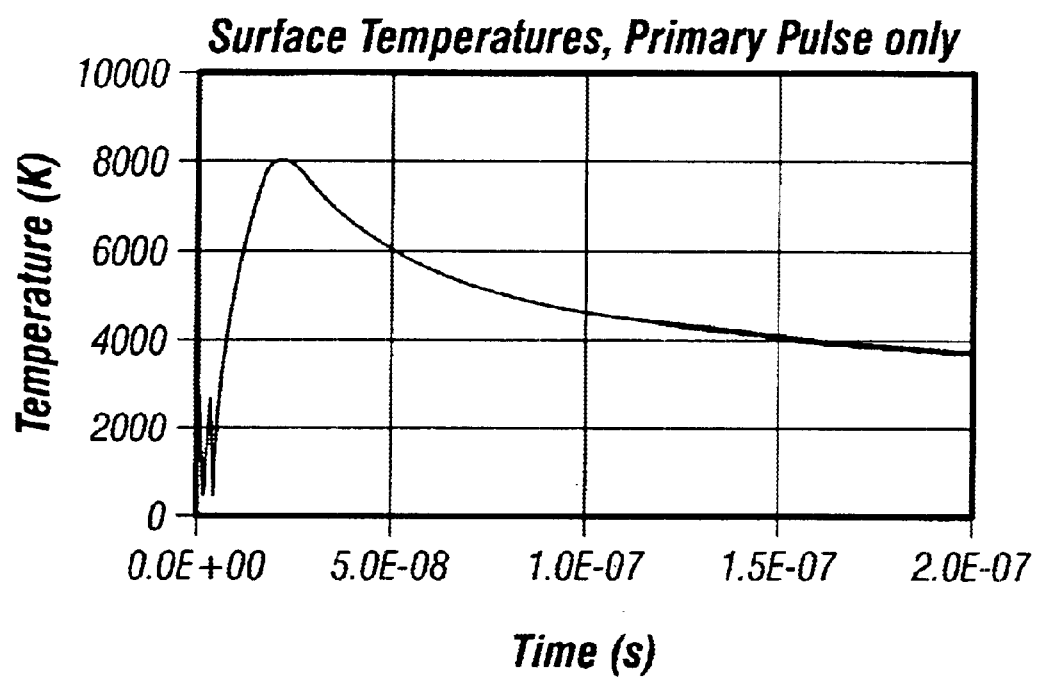
FIG. 13 is a plot illustrating the surface temperature history due to the primary pulse in accordance with one embodiment of the invention.

Temperature Measurements:

The temperature measurements are based on thermal emission measured using an InGaAs photodiode, the operation and functionality of which is well known in the art. The rise time of the photodiode is less than 3 ns. FIG. 13 shows the temperature history of materials above the surface of the workpiece (including the slow-moving ejecta) for a 3 ns laser pulse incident on an aluminum target. FIG. 13 shows that the temperature remains much higher than the boiling temperature of 2520 K for periods of time far exceeding the 90 ns inter-pulse delay.

In accordance with the description of the gradients and their evolution as described with reference to FIGS. 6A–6E, it is well known that optical emission measurements represent the integration of emission and absorption along the line of sight through the plasma to the cold material in the back of the workpiece. Naturally, the hot regions emit more light than the cooler regions, but this is offset by the tendency of plasma to absorb light and the previously discussed nature of dense plasmas to prevent the propagation of light. This will apply to light leaving the plasma as well as light entering the plasma.

Consequently the emissions from hot interior regions may be screened by the presence of outer plasma or ejecta. The time lapse photography measurements (of FIGS. 14–16) show that the time required for the ablation plasma to dissipate is around 30 nanoseconds. During this time, the emission detected by the photodiode undergoes a large increase and then levels off before decreasing slowly over the next hundred nanoseconds. During the first 30 nanoseconds, the temperatures derived from the emissions are not likely to be representative of the slow moving ejecta, but probably arise from some line of sight integration through the ablation plasma.

The time-lapse photography measurements of ejecta also show that for times later than 30 ns, there is no intervening plasma and that the expansion velocities of the slow-moving material are slow. Hence, for times longer than 30 ns after the incidence of a laser pulse the emissions recorded by the photodiode arise from material close to the target surface, not from a shock wave propagating away through air from the laser focus.

As previously discussed with reference to FIGS. 6A–6E, the temperature of the ablation plasma may exceed 20,000 K, and as is evident from the preceding discussion of emission measurements the temperature of the slow moving ejecta at 30 ns after the laser pulse is on the order of 7000 K (i.e., which is less than 10,000 K). This measurement of emission was made using an aluminum target, and the temperatures may vary depending on the material and the laser used. In many embodiments the ablation plasma may exceed 20,000 K by orders of magnitude.

It is also noted that the temperature of the ablation plasma (e.g., an expanding ablation plume and any phenomena resulting from the interaction with ambient atmospheres, such as a shock wave) is not illustrated in FIG. 13. It is also noted that during the first 30 ns, the plume of the ablation plasma and if present, a shock wave, obscures the hot material at the surface of the workpiece (including the slow-moving ejecta); thus, the temperature is not accurately illustrated in FIG. 13 for the slow-moving ejecta during the first 30 ns.

It is noted that different materials will yield different results, as will variances in the energy, duration, wavelength, etc. of the primary pulse; however, generally, it has been found that the primary pulse produces a first material phase (e.g., ablation plasma) that is heated to temperature of at least 20,000 K and a second material phase (e.g., the slow-moving ejecta) that is heated to temperatures less than 10,000 K. As such, the secondary pulse(s) are timed to act primarily upon the second material, which is heated and then acts upon the workpiece surface. It is also noted that in many embodiments, the first material phase is heated to temperatures more than 5 times, preferably more than 10 times than the temperature of the second material.

Figure 14:
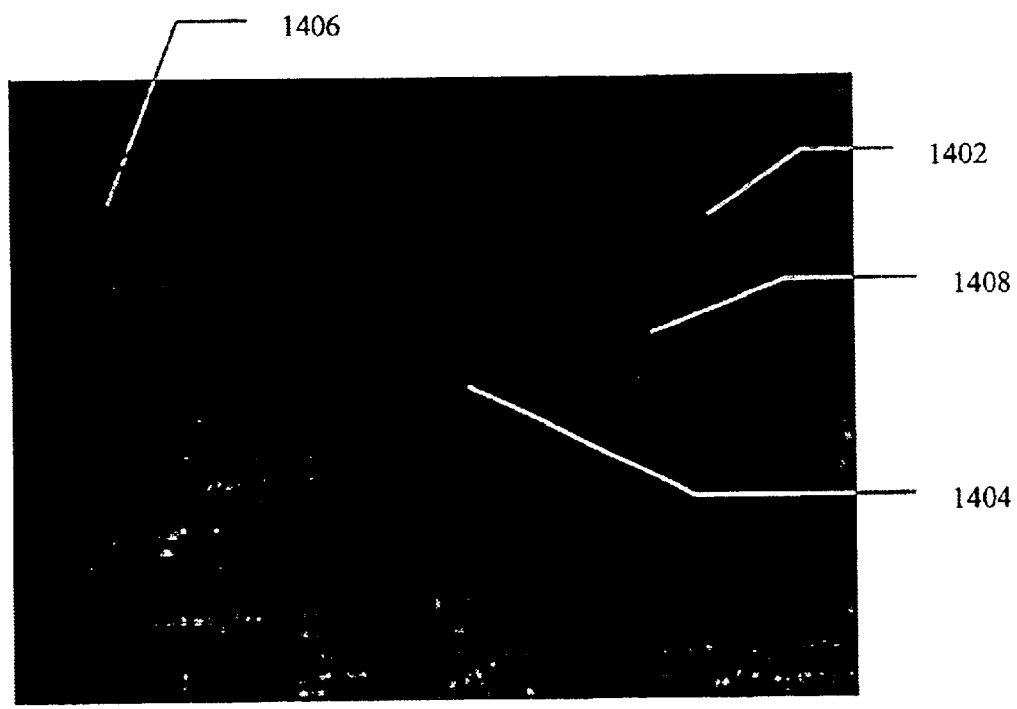
FIG. 14 is a photographic image of the surface of workpiece 11 ns after impact with a single laser pulse in accordance with one embodiment of the invention.
Figure 15:
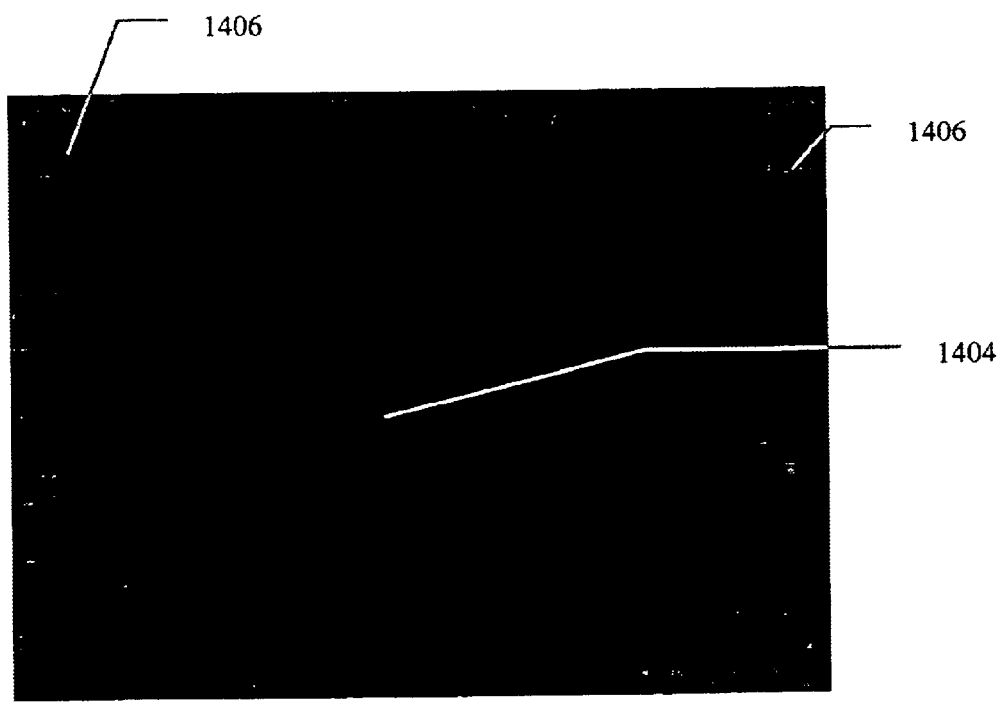
FIG. 15 is a photographic image of the surface of the workpiece of FIG. 14 37 ns after impact with the laser pulse.
Figure 16:
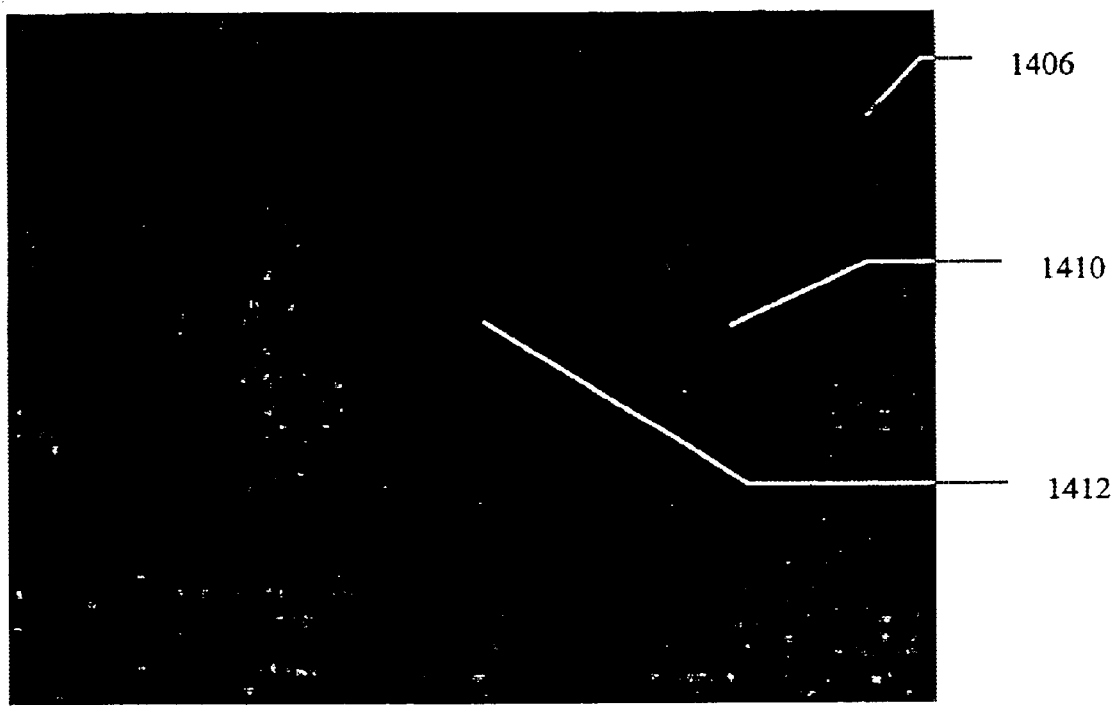
FIG. 16 is a photographic image of the surface of the workpiece of FIG. 15 30 s after impact with the laser pulse.

Time-Lapse Photography (Ejecta) Measurements:

Referring next to FIGS. 14–16, photographic images are shown of the surface of workpiece at various times after impact with a single laser pulse (e.g., a primary a pulse). For these measurements aluminum targets were studied by imaging the target point onto a camera. The target was illuminated with a 3 ns laser pulse having a wavelength of 532 nm. A single pulse from the machining laser having a wavelength of 355 nm was directed onto the target, such as illustrated in FIG. 7. It is noted that the photographic images of FIGS. 14–16 are taken at a 60-degree angle relative to the workpiece and a 30-degree angle relative to the incident laser pulse. The timing of the illumination laser was varied from 10 to 50 ns after the machining pulse, providing images of the target at different times after interaction with the machining laser. A long time after the shot (30 seconds) the illumination laser was fired a second time, producing a post-shot image of the target when all processes on the target had stopped evolving (See FIG. 16).

As seen in FIG. 14, the results show that at a probe laser delay time of 11 ns after the primary laser pulse, the right side of the target is still obscured by the plasma plume 1402 produced by the primary pulse. The slow moving ejecta 1404 that has a higher density and is closer to the surface of the workpiece is also illustrated. The oblique angle of incidence of the photographic collection system and the inherent surface features of the aluminum foil assist in revealing this feature. The horizontal lines 1406 embedded in the rolled foil sample in the manufacturing process are visible on one side (the left side) of the central dark spot but not on the other side (right side). This is because an ablation plasma 1402 and if present, a shockwave, is rising up from the surface and the obliquely incident probe laser cannot penetrate it to reveal the undamaged target surface on the right hand side of the laser spot. Furthermore, also illustrated is artifact 1408, which is imposed on the image by the lens. FIG. 15 shows a picture of the target 37 ns after the primary laser pulse has struck the target. Here, the ablation plasma has substantially dissipated and the probe light illuminates the undamaged target on both sides of the laser spot, i.e., the horiozontal lines 1406 are visible on both sides of the surface. The laser spot itself is completely dark, revealing the presence of the slow-moving ejecta 1404 immediately in the vicinity of the target surface. FIG. 16 shows the target 30 s after the laser shot. The damaged area 1410 or damaged spot approximately the same diameter as the dark spot of FIG. 15 is clearly visible, and has a deeper depression or central hole 1412 with steep walls that shows up as a dark spot in the center.

It is currently believed that three salient features are that first, the images where the illumination laser is delayed by tens of nanoseconds (see FIG. 14) show completely dark areas of the target, suggesting a highly absorbing or a highly scattering medium. The second feature is that the images taken 30 seconds after the machining (see FIG. 16) show that the size of the total effect of the laser on the target is approximately equal to the dark area or damaged area 1410. Third, in this embodiment, since the axis of the collection optics have about a 60° angle of incidence, the extent of the "dark matter", which includes the slow-moving phase of the ejecta 1404 (e.g., ejecta 902), can be no more than 100 $\mu$m above the target surface at target center and less than 10 $\mu$m at the edges of the spot. If the ejecta 1404 were higher above the surface than this, it would obscure the target visible on the right-hand side of the pictures that is visible in FIGS. 15 and 16, but not in FIG. 14. This suggests a very slow axial expansion speed, ranging from at most $10^4$ to $10^5$ cm/s. Since the photographs show no evidence of lateral expansion after 30 ns, the lateral expansion velocity can be no more than $10^3$ cm/s.

Interaction of the Secondary Pulse and Enhanced Machining Rates:

Four conclusions relevant to the double pulse laser machining can be drawn from the diagnostic results. It is believed that these four conclusions form the basis upon which several embodiments of the invention may be understood and applied to wide varieties of materials, lasers, and processes.

Conclusion #1: The material removal process following the primary pulse occurs in two phases: the rapidly moving ablation plasma (e.g., ablation plasma 802) and a body of slow-moving ejecta (e.g., ejecta 902) that remains in the vicinity of the target point for periods of time measured in the hundreds or thousands of nanoseconds. This conclusion is evident from the time-lapse photographs and the pressure measurements.

Conclusion #2: The second conclusion is that the slow-moving ejecta is probably in a mixed liquid-vapor phase. This conclusion stems from its low expansion velocity. Low expansion velocity implies low hydrodynamic pressure.

Figure 17:
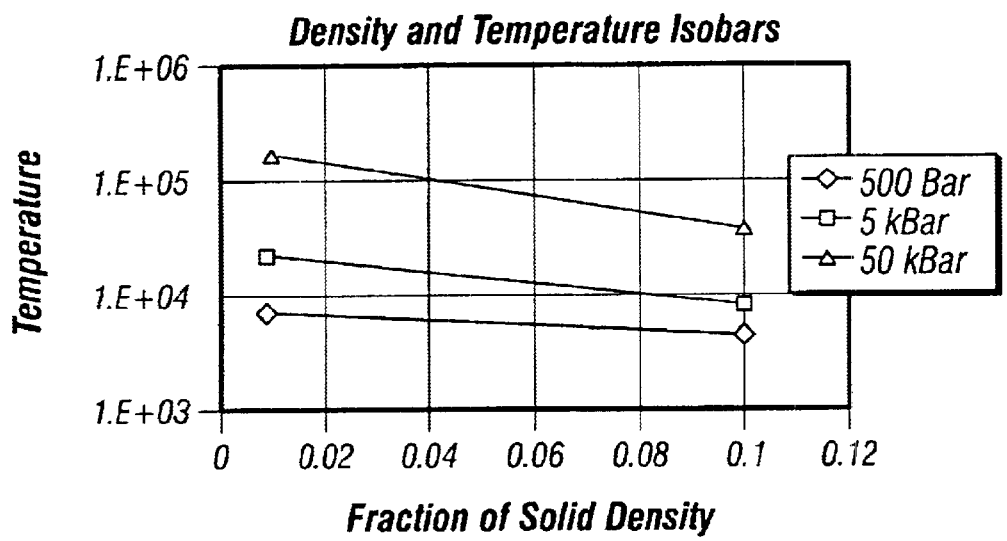
FIG. 17 is a plot illustrating density and temperature isobars according to one embodiment of the invention.

Calculation and measurement (such as taken from D. Bauerle, *Laser Processing and Chemistry*, pp. 638–642, Springer-Verlag, New York, 2000, which is incorporated herein by reference) show that the expansion velocity of the initial ablation plasma is of the order of $10^6$ cm/s, and the pressure measurements in the present work, using aluminum targets, show that 45 kBar pressures correspond to those expansion velocities. Since the expansion velocity of the slow-moving matter is, at most $1/10^{th}$ to $1/1000^{th}$ of the velocity of the ablation plasma, it is reasonable to presume that the pressure is at most $1/10^{th}$ to $1/1000^{th}$ the pressure of the ablation plasma. Thus, the pressure ranges from 50 Bar to 5 kBar. FIG. 17 shows the density and temperature of aluminum at 3 pressures, as calculated by the well-known quotidian equation of state (QEOS), which is substantially different from the ideal gas equation of state. Since the temperature of the slow-moving ejecta ranges from 4000–8000 K (although the temperature may approach 10,000 K depending on the embodiment), FIG. 17 shows that the density of the slow-moving matter ranges from $\frac{1}{10}^{th}$ to less than $\frac{1}{100}^{th}$ solid density. This combination of densities and temperatures corresponds to the liquid-vapor coexistence region of aluminum that is predicted by QEOS.

Conclusion #3: The secondary laser pulse in general does not interact directly with the workpiece but instead acts primarily on the slow-moving matter (i.e., ejecta 902) to form another plasma (e.g., material 1002) that then interacts with the workpiece and ejecta.

The interaction of the secondary pulse(s) with the target is clearly substantially different than the interaction of the primary pulse. There is a body of ejecta lingering in the immediate vicinity of the workpiece that strongly interacts with incoming laser light (e.g., the secondary laser pulse(s)) and the pressure developed in the solid targets by the secondary laser pulse(s) is a fraction of the pressure developed by the primary laser pulse.

Conclusion #4: The volume, mass, and composition of the slow-moving material (i.e., ejecta 902) affects the nature of the interaction of the secondary pulse(s).

The means by which the plasma produced by the secondary pulse(s) interacts with the workpiece is probably a combination of thermal conduction, pressure, and modifications of the material flow away from the workpiece.

For example, a primary pulse interaction that produces a large, thick layer of slow-moving material will probably provide less thermal conduction from the region heated by the secondary laser pulse to the workpiece than would be the case for a thin layer of slow-moving material, provided the thermal conductivities are equivalent.

Figure 18:
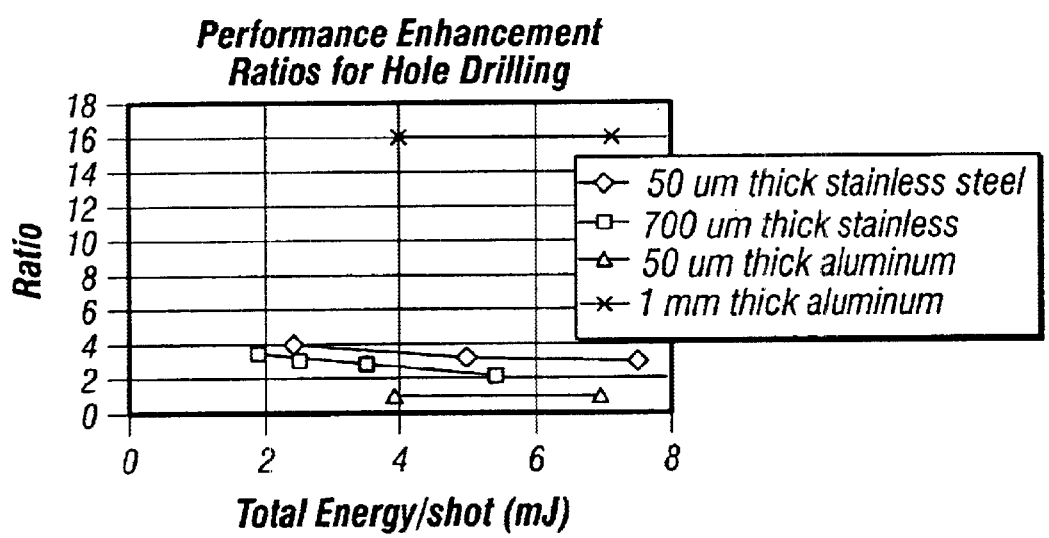
FIG. 18 is a plot illustrating performance enhancement ratios for hole drilling in Aluminum and Steel according to one embodiment of the invention.

This phenomenon is underscored by the comparison of hole drilling in aluminum and stainless steel using the method of one embodiment of the invention. FIG. 18 shows the performance enhancement ratios, which is the number of $\mu$m removed from the target for each shot of the laser using one embodiment of the double pulse technique, e.g., of FIG. 2A, divided by the number of $\mu$m removed from the target for each shot of the laser using the single pulse technique, e.g., of FIG. 1. Since in one embodiment, the double pulse configuration each laser shot is split into a primary and secondary pulse, the ratio is calculated using the total energy on target for each laser shot as a basis for comparison. For example, the cutting rate for the double pulse technique when the sum of the energies of the primary and secondary pulses is equal to 2 mJ will be divided to by the cutting rate of the single pulse technique when the single pulse has an energy of 2 mJ to obtain the performance enhancement ratio at 2 mJ.

The difference in results using this embodiment of the double pulse technique is clearly material-dependent, as seen in FIG. 18. Whereas double pulse drilling yields roughly equal enhancements in thin or thick steel, enhancement is not seen in thin aluminum but is seen in thick aluminum. A plausible explanation rests in the different thermal diffusivities of aluminum and steel. Chart 1 shows the approximate thermal conductivities and the energies required to boil away equivalent volumes of aluminum and stainless steel.

CHART 1

| | Approximate energy required to heat from 300 K and boil, in J/cm$^3$ | Approximate thermal conductivity, in W/m/K |
|---|---|---|
| Aluminum | 20,000 | 1 |
| Stainless Steel | 65,000 | 0.2 |

While the primary laser pulse is producing the ablation plasma 802, thermal conduction from the plasma will heat the solid density target material that is not ablated. Since the pressure developed by the ablation plasma is high enough, as seen in FIGS. 11 and 17, to restrain the expansion of the low-density material that would be produced by evaporation, superheated material is formed that does not boil away until after the laser pulse. It is likely that the post-shot evaporation of the superheated material forms the layer of slow-moving material. Chart 1 shows that aluminum has 5 times the thermal conductivity and $\frac{1}{3}$ the heat capacity of stainless steel. Hence, thermal conduction will transport energy more rapidly into aluminum and the aluminum will get hot and melt and boil with less energy than an equivalent volume of stainless steel. Consequently, when the primary laser pulse strikes the aluminum target it will produce a more massive layer of slow-moving material (ejecta 902) than the primary pulse produces in a steel target.

Figure 19:
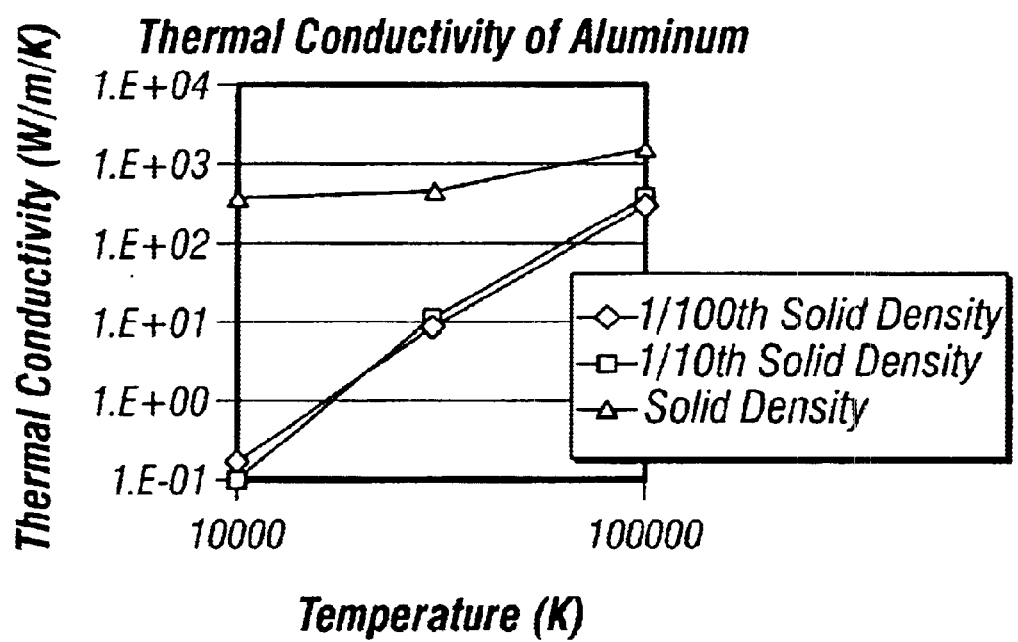
FIG. 19 is a plot illustrating thermal conductivity of Aluminum plasma at 3 densities according to one embodiment of the invention.

In several embodiments, the pressure under which the superheated layer forms is of great importance regarding the interaction of the secondary pulse(s). Since the secondary pulse generates a pressure of 5 kbar, and does so from a plasma that has a density between $\frac{1}{10}^{th}$ and $\frac{1}{100}^{th}$ of solid density, then according to FIG. 17, the peak temperature of the secondary plasma (e.g., the material 1002 heated by the secondary pulse is between 10,000 and 100,0000 K. FIG. 19 shows the thermal conductivity of aluminum, demonstrating that the conduction of heat through this plasma approaches that through cold solid aluminum as temperatures increases. Thus, the secondary pulse provides a hot plasma (e.g., material 1002) in good thermal contact with the workpiece, but without the high pressures that accompany the primary pulse. Consequently, the material will boil more easily, and form less superheated liquid for the secondary pulse than for the primary pulse.

Under the correct conditions, this process leads to rapid material removal. In the case of stainless steel, which in general produces less ejecta per shot than aluminum, the distance over which the heat from the secondary pulse must be conducted is less and the tendency of the ejecta to occlude drill holes will be less. This is reflected in the machining enhancement ratios of FIG. 18. In the case of aluminum, more ejecta 902 is produced, reducing the effectiveness of thermal transport by the secondary pulse and increasing the tendency to occlude deep holes.

Hole occlusion is worth further discussion. Whereas the aforementioned processes in stainless steel appear to be dominated by the physics of evaporation and thermal transport, the plasma produced by the secondary pulse in aluminum targets enhances the machining rate for different reasons. As shown in FIG. 18, the secondary pulse has relatively little effect on thin aluminum since the hole never gets deep enough for the slow moving material to either clog the hole or require enough shots to have large depths of recast build up.

In aluminum holes deeper than 500 $\mu$m, the $10^5$ cm/s velocity of the slow-moving layer means that 500 ns time is required for the slow-moving material to clear the hole. FIG.

13 clearly shows that the temperature of the slow-moving material dropping close to the boiling point after only 200 ns. Obviously substantial cooling sets in before the slow moving material clears the hole, resulting in increased redeposition of material, and consequent reduction of machining rates. The secondary pulse heats the slow-moving material and assists its flow out of the hole and away from the target, thereby reducing the tendency to occlude the hole.

It is also worthwhile mentioning the magnitude of the pressures that may exist in the secondary plasma and assist the flow of material away from the target spot. Although FIGS. 11 and 12 show that the pressure of the primary pulse is several times the pressure of the secondary pulse(s), the secondary plasma may be greater in extent than the primary plasma since it has had time to expand between the two pulses. This expansion opens another possibility for the manipulation of the interaction of the secondary plasma with the workpiece. It could be used as an ultra-high pressure gas assist jet.

FIG. 12 shows that the pressure produced secondary pulse ranges from a few kbar to twenty kBar. In psi, this range is from 30,000 to 300,000 psi—and this is not an upper limit but is limited in testing by the available laser power. It is conceivable that the ultimate pressure could be much higher. This high pressure is indeed being transferred to the workpiece since these pressures are measured at the back surface of a thin foil, opposite to the side struck by the machining laser. These pressures clearly have the ability to blow molten or weakened material produced by the primary pulse out of the cut, thereby achieving higher machining rates.

Figure 20:
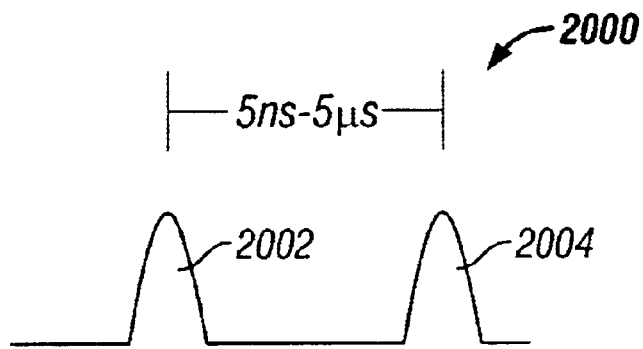
FIGS. 20–22 are illustrations of burst formats in accordance with additional embodiment of the invention.
Figure 21:
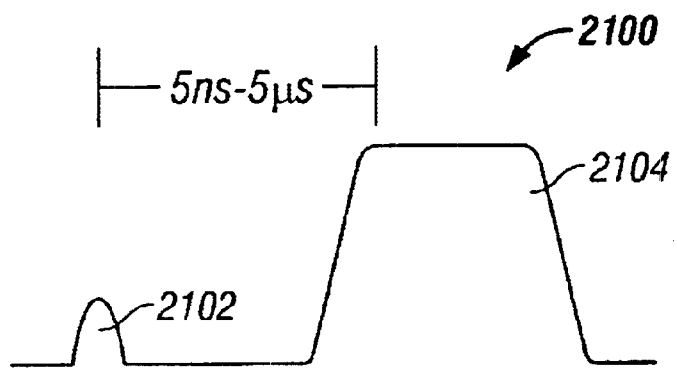
Figure 22:
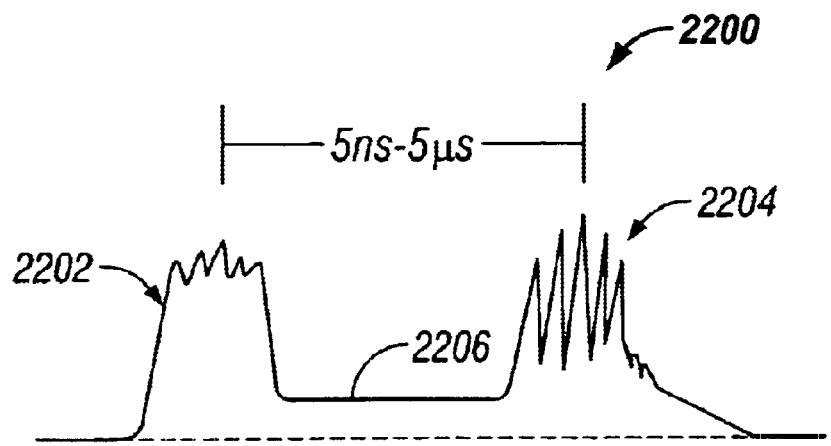

Referring next to FIGS. 20–22, illustrated are burst formats in accordance with additional embodiments of the invention. As such, the bursts of FIGS. 20–22 are designed such that the secondary pulse is timed to occur after substantial dissipation of the ablation plasma such that it interacts with the slow moving ejecta that is close to the surface of the workpiece. Furthermore, as described above, the time in between subsequent bursts is greater than the duration in between the pulses of each burst, for example, greater than 10–1000 times.

FIG. 20 illustrates a burst 2000 having a primary pulse 2002 and a secondary pulse 2004 that are discrete, gaussian rounded pulses, as opposed to square pulses, e.g., as illustrated in FIG. 2A. As described above, in one embodiment, the individual pulses 2002, 2004 comprising each burst 2000 have durations ranging from 10 ps to 100 ns and the time between each pulse 2002, 2004 within the burst 2000 ranges from 5 ns to 5 us. Such a burst may be generated by using a laser as is understood in the art.

FIG. 21 illustrates burst 2100 including a primary pulse 2102 and a secondary pulse 2104. In this embodiment, the secondary pulse 2104 has a duration that exceeds the duration of the primary pulse, e.g., by about 10 times. Also, the intensity and energy of the secondary pulse 2104 exceeds that of the primary pulse 2102. The primary pulse 2102 is configured as described above and such that the intensity (i.e., amplitude of the pulse) exceeds the damage threshold of the workpiece. However, it is advantageous that the secondary pulse 2104 have a higher duration, intensity and energy than the primary pulse 2102. For example, since the pressure produced during the interaction with the secondary pulse 2104 is a fraction (e.g., ¼) of that produced during interaction with the primary pulse 2102, it is advantageous to increase one or more of the intensity, energy and duration of the secondary pulse 2104 in comparison to that of the primary pulse 2102. For example, the intensity of the secondary pulse 2104 may be up to 10 times greater than that of the primary pulse 2102 (preferably about 3 times). Likewise, the duration of the secondary pulse 2104 may be up to 20 times greater than the duration of the primary pulse 2102 (preferably 10 times greater). In terms of pulse energy, the energy of the secondary pulse 2104 may be up to 10 times greater than the energy of the primary pulse 2102. It has been seen that alteration of parameters of the secondary pulse 2104 relative to the primary pulse 2102 take advantage of the lower pressure created during the interaction with the secondary pulse 2104 and; thus, further enhances the material modification process. Such a burst may be generated by using a laser as is understood in the art FIG. 22 illustrates yet another burst 2200 having a primary pulse 2202 and a secondary pulse 2204. In this embodiment, the primary pulse 2202 is a series of very short overlapping pulses that function as a single pulse. This type of pulse structure may be generated by the laser or by optics that split and combine a pulse. The secondary pulse 2204 is similar to the primary pulse 2202 however, there is less overlap in between the component pulses. Thus, although the primary pulse 2202 and the secondary pulse 2204 are different than the primary pulse 204 and secondary pulse 206 illustrated, for example, in FIG. 2A, they are designed to function equivalently. The secondary pulse may also be created using a laser device or by using the appropriate optics to split and combine a sub-pulse or by mode beating of the laser. The primary pulse 2202 and the secondary pulse 2204 are also designed to have a duration of between 10 ps and 100 ns, as described above. It is also noted that an intermediate laser emission 2206 exists in between the primary pulse 2202 and the secondary pulse 2204; however, is generally considered noise. It is generally important that any intermediate laser emission present has a sufficiently low intensity that will not cause additional ablation plasma to be produced from the workpiece since the secondary pulse 2204 is to be timed to occur after substantial dissipation of the ablation plasma. It is also noted that the burst 2200 may alternatively have no intermediate laser emission. It is also noted that a particular burst may comprise at least pulses similar to pulse 2202 or at least two pulses similar to pulse 2204. In further variations, a given burst may comprise different combinations of the individual types of pulses illustrated in FIGS. 2A, 2B and 20–22.

While the invention herein disclosed has been described by means of specific embodiments and applications thereof, numerous modifications and variations could be made thereto by those skilled in the art without departing from the scope of the invention set forth in the claims.

What is claimed is:

1. A method for material modification, comprising:
  providing bursts of laser pulses, wherein each burst comprises at least two laser pulses, wherein each laser pulse has a pulse duration within a range of between approximately 10 ps and 100 ns, wherein a time between each laser pulse of each burst is within a range of between approximately 5 ns and 5 $\mu$s;
  a time between successive bursts is greater than the time between each laser pulse comprising each burst; and
  directing the bursts upon a workpiece, wherein an intensity of a primary laser pulse of each burst is sufficient to cause a portion of the workpiece to exhibit a temperature beyond its melt temperature, at least one subsequent laser pulse timed to interact with be portion heated by the primary laser pulse and wherein an intensity of at least one subsequent laser pulse exceeds a damage threshold of the portion heated by the primary laser pulse.

2. The method according to claim 1 wherein the laser pulses of each burst comprise discrete laser pulses.

3. A method for material modification, comprising:
providing bursts of laser pulses, wherein each burst comprises at least two laser pulses, wherein each laser pulse has a pulse duration within a range of between approximately 10 ps and 100 ns, wherein a time between each laser pulse of each burst is within a range of between approximately 5 ns and 5 µs;
a time between successive busts is greater than the time between each laser pulse comprising each burst;
directing the bursts upon a workpiece, wherein an intensity of a primary laser pulse of each burst exceeds a damage threshold of the workpiece; and
wherein each burst comprises overlapping laser pulses.

4. The method according to claim 3 wherein an intermediate laser emission between a pair of overlapping laser pulses within a burst has an intensity that does not cause additional ablation plasma to be generated upon interacting with the workpiece.

5. The method according to claim 1 wherein the laser pulses comprising the bursts have substantially equal durations.

6. The method according to claim 1 wherein the laser pulses comprising the bursts have different durations.

7. The method according to claim 1 wherein the laser pulses comprising the bursts have substantially equal energies.

8. The method according to claim 1 wherein the laser pulses comprising the bursts have different energies.

9. The method according to claim 1 wherein the laser pulses comprising the bursts have substantially identical spatial distributions.

10. The method according to claim 1 wherein the laser pulses comprising the bursts have differing spatial distributions.

11. The method according to claim 1 wherein two or more bursts of pulses are directed onto the workpiece repetitively.

12. The method according to claim 1 wherein the laser pulses comprising the bursts comprise light having substantially identical wavelengths.

13. The method according to claim 1 wherein the laser pulses comprising the bursts comprise light having different wavelengths.

14. A method for material modification, comprising:
providing bursts of laser pulses, wherein each burst comprises at least two laser pulses, a time between successive bursts is greater than a time between each laser pulse comprising each burst;
directing the bursts upon a workpiece, wherein an intensity of a primary laser pulse of each burst exceeds a damage threshold of the workpiece;
wherein a primary pulse of each burst produces an ablation plasma and an ejecta; and
wherein a secondary pulse of each burst is timed to occur after substantial dissipation of the ablation plasma and to interact with the ejecta, whereby forming a heated material that interacts with the workpiece.

15. The method according to claim 14 wherein each laser pulse has a pulse duration within a range of between approximately 10 ps and 100 ns, and wherein a time between each laser pulse of each burst is within a range of between approximately 5 ns and 5 µs.

16. The method according to claim 14 wherein the laser pulses of each burst comprise discrete laser pulses.

17. A method for material modification, comprising:
providing bursts of laser pulses, wherein each burst comprises at least two laser pulses, a time between successive bursts is greater than a time between each laser pulse comprising each burst;
directing the bursts upon a workpiece, wherein an intensity of a primary laser pulse of each burst exceeds a damage threshold of the workpiece;
wherein a primary pulse of each burst produces an ablation plasma and an ejecta;
wherein a secondary pulse of each burst is timed to occur after substantial dissipation of the ablation plasma and to interact with the ejecta, whereby forming a heated material that interacts with the workpiece; and
wherein each burst comprises overlapping laser pulses.

18. The method according to claim 17 wherein an intermediate laser emission between a pair of overlapping laser pulses within a burst has an intensity that does not cause additional ablation plasma to be generated upon interacting with the workpiece.

19. The method according to claim 14 wherein the laser pulses comprising the bursts have substantially equal durations.

20. The method according to claim 14 wherein the laser pulses comprising the bursts have different durations.

21. The method according to claim 14 wherein the laser pulses comprising the busts have substantially equal energies.

22. The method according to claim 14 wherein the laser pulses comprising the bursts have different energies.

23. The method according to claim 14 wherein the laser pulses comprising the bursts have substantially identical spatial distributions.

24. The method according to claim 14 wherein the laser pulses comprising the bursts have differing spatial distributions.

25. The method according to claim 14 wherein two or more bursts of pulses are directed onto the workpiece repetitively.

26. The method according to claim 14 wherein the laser pulses comprising the bursts comprise light having substantially identical wavelengths.

27. The method according to claim 14 wherein the laser pulses comprising the bursts comprise light having different wavelengths.

28. A method for material modification, comprising:
providing bursts of laser pulses, wherein each burst comprises at least two laser pulses, a time between successive bursts is greater than a time between each laser pulse comprising each burst;
directing the bursts upon a workpiece, wherein an intensity of a primary leer pulse of each burst exceeds a damage threshold of the workpiece;
wherein a primary pulse of each burst produces a first material phase to a temperature greater than 20,000 K and a send material phase to a temperature less than 10,000 K; and
wherein a secondary pulse of each burst is timed to primarily interact with the second material phase.

29. An apparatus for material modification comprising:
a laser configured to produce laser pulses having a pulse duration within a range of between approximately 10 ps and 100 ns, a time in between the laser pulses greater than the pulse duration;
a beam splitter configured to split each laser pulse into split laser pulses;

a laser path traveled by each of the split laser pulses, each laser path having different lengths;

a beam combiner configured to receive each of the split laser pulses and direct the split laser pulses as a burst onto a workpiece;

the different lengths of the each laser path configured to cause a time of arrival at the workpiece between a primary split laser pulse and a subsequent split laser pulse such that the subsequent split laser pulse interacts with a portion of the workpiece heated by the primary split laser pulse; and a primary laser pulse of the split laser pulses configured to heat the portion of the workpiece to a temperature beyond its melt temperature.

30. The apparatus according to claim 29 further comprising at least one reflector defining one of the laser paths.

31. The apparatus according to claim 29 further comprising a focusing assembly configured to focus the split laser pulses onto the workpiece.

32. The apparatus according to claim 29 wherein the beam splitter and beam combiner are configured to produce discrete split laser pulses.

33. The apparatus according to claim 29 wherein the beam splitter and beam combiner are configured to produce overlapping split laser pulses.

34. The apparatus according to claim 29 wherein the beam splitter and beam combiner are configured to produce the split laser pulses comprising each burst to have substantially equal durations.

35. The apparatus according to claim 29 wherein the beam splitter and beam combiner are configured to produce the split laser pulses comprising each burst to have different durations.

36. The apparatus according to claim 29 wherein the beam splitter and beam combiner are configured to produce the split laser pulses comprising each burst to have substantially equal energies.

37. The apparatus according to claim 29 wherein the beam splitter and beam combiner are configured to produce the split laser pulses comprising each burst to have different energies.

38. The apparatus according to claim 29 wherein the beam splitter and beam combiner are configured to produce the split laser pulses comprising each burst to have substantially identical spatial distributions.

39. The apparatus according to claim 29 wherein the beam splitter and beam combiner are configured to produce the split laser pulses comprising each burst to have differing spatial distributions.

40. The apparatus according to claim 29 wherein the beam splitter is configured to produce the split laser pulses comprising each burst to have substantially identical wavelengths.

41. The apparatus according to claim 29 wherein the beam splitter is configured to produce the split laser pulses comprising each burst to have different wavelengths.

42. An apparatus for material modification, comprising:
means for providing bursts of laser pulses, wherein each burst comprises at least two laser pulses, wherein each laser pulse has a pulse duration within a range of between approximately 10 ps and 100 ns, wherein a time between each laser pulse of each burst is within a range of between approximately 5 ns and 5 $\mu$s;

a time between successive bursts is greater than the time between each laser pulse comprising each burst; and means for directing the bursts upon a workpiece, wherein an intensity of a primary laser pulse of each burst is sufficient to cause a portion of the workpiece to exhibit a temperature beyond its melt temperature, at least one subsequent laser pulse timed to interact with the portion heated by the primary laser pulse and wherein an intensity of at least one subsequent laser pulse exceeds a damage threshold of the portion heated by the primary laser pulse.

43. The method according to claim 1 wherein an intensity of the primary laser pulse of exceeds a damage threshold of the workpiece.

44. The apparatus according to claim 29 wherein an intensity of the primary laser pulse of exceeds a damage threshold of the workpiece.

45. The apparatus according to claim 29 wherein the different lengths of the each laser path are configured to cause a time of arrival at the workpiece between the split laser pulses to range between 5 ns and 5 $\mu$s.

46. A method for material modification, comprising:
providing bursts of laser pulses, wherein each burst comprises at least two laser pulses, wherein each laser pulse has a pulse duration within a range of between approximately 500 ps and 100 ns, wherein a time between each laser pulse of each burst is within a range of between approximately 10 ns and 5 $\mu$s;

a time between successive bursts is greater than the time between each laser pulse comprising each burst; and directing the bursts upon a workpiece, wherein an intensity of a primary laser pulse of each burst exceeds a damage threshold of the workpiece.

\* \* \* \* \*

UNITED STATES PATENT AND TRADEMARK OFFICE
CERTIFICATE OF CORRECTION

PATENT NO. : 6,664,498 B2 Page 1 of 1
APPLICATION NO. : 10/120731
DATED : December 16, 2003
INVENTOR(S) : Forsman et al.

It is certified that error appears in the above-identified patent and that said Letters Patent is hereby corrected as shown below:

Column 22, line 53, change the word "leer" to -- laser --.

Column 24, line 27, delete the second occurrence of "of".

Column 24, line 30, delete the second occurrence of "of".

Column 24, line 33, delete "the".

Signed and Sealed this

Nineteenth Day of January, 2010

David J. Kappos
*Director of the United States Patent and Trademark Office*